(12) United States Patent
Obana

(10) Patent No.: US 8,494,216 B2
(45) Date of Patent: Jul. 23, 2013

(54) IMAGE PROCESSING DEVICE AND IMAGE PROCESSING METHOD AND PROGRAM

(75) Inventor: Michimasa Obana, Tokyo (JP)

(73) Assignee: Sony Corporation, Tokyo (JP)

( * ) Notice: Subject to any disclaimer, the term of this patent is extended or adjusted under 35 U.S.C. 154(b) by 783 days.

(21) Appl. No.: 12/436,412

(22) Filed: May 6, 2009

(65) Prior Publication Data

US 2009/0296986 A1    Dec. 3, 2009

(30) Foreign Application Priority Data

May 30, 2008  (JP) ................................ 2008-142981

(51) Int. Cl.
*G06K 9/00* (2006.01)
*G06K 9/46* (2006.01)
*H04N 5/225* (2006.01)

(52) U.S. Cl.
USPC ............................ 382/103; 382/201; 348/169

(58) Field of Classification Search
USPC ....... 382/103, 154, 201; 348/169; 375/240.16
See application file for complete search history.

(56) References Cited

U.S. PATENT DOCUMENTS

| 2005/0196017 A1* | 9/2005 | Altherr et al. ................. 382/103 |
| 2007/0126864 A1* | 6/2007 | Bhat et al. ........................ 348/51 |
| 2008/0187175 A1* | 8/2008 | Kim et al. ..................... 382/103 |
| 2008/0205700 A1* | 8/2008 | Nir ................................. 382/103 |

FOREIGN PATENT DOCUMENTS

| EP | 1 710 751 A1 | 10/2006 |
| JP | 2007-274543 | * 10/2007 |
| WO | WO 2006/111962 A2 | 10/2006 |
| WO | WO 2006/111962 A3 | 10/2006 |

* cited by examiner

*Primary Examiner* — Amara Abdi
(74) *Attorney, Agent, or Firm* — Oblon, Spivak, McClelland, Maier & Neustadt, L.L.P.

(57) ABSTRACT

An image processing device includes a tracking unit to track a predetermined point on an image as a tracking point, to correspond with a first operation. The image processing device also includes a display control unit to display tracking point candidates, which are greater in number than objects on the image and fewer than the number of pixels of the image, on the image, at an equidistant spacing. Further the image processing device includes a setting unit to set one of the tracking point candidates as a tracking point on a next frame of the tracking unit, in response to an instruction of the one of the tracking point candidates during a display of the tracking point candidates at the equidistant spacing.

10 Claims, 24 Drawing Sheets

21

21

31

[THIRD TIME PLAYING]: DETERMINE TENTATIVE TRACKING POINT CANDIDATES FROM EDITING HISTORY (OPERATED ONCE)

| FIG. 28A |
| FIG. 28B |

IMAGE PROCESSING DEVICE AND IMAGE PROCESSING METHOD AND PROGRAM

BACKGROUND OF THE INVENTION

1. Field of the Invention

The present invention relates to an image processing device and image processing method, and a program, and more specifically, it relates to an image processing device and image processing method, and a program such that a user can easily instruct a desired tracking point.

2. Description of the Related Art

Hitherto, many methods have been proposed as methods for tracking a subject which a user has instructed in a moving image. In such methods, as a method to hold generality without limiting the tracking subject, a method is particularly generally used wherein a user first instructs a point within a tracking subject as a tracking starting point, and a tracking device tracks the tracking image thereof fully automatically.

However, in reality, for example, continuing fully automatic tracking over a long period of time is difficult, with various disturbances such as an occlusion occurring wherein a tracking subject in an image is widely distorted and a rigid assumption is no longer established. Accordingly, the user has to correct the tracking point as appropriate.

A user performing operations as to a moving image to instruct a tracking point as a tracking starting point or a tracking correction point is extremely difficult, whereby the object of the present invention is to provide a method to simplify of this operation. As such a method, there is a method to extract a subject, and display the points within the subject thereof as candidates for a tracking point (e.g. see Japanese Unexamined Patent Application Publication No. 2007-274543).

SUMMARY OF THE INVENTION

However, with the method described in the above-described Japanese Unexamined Patent Application Publication No. 2007-274543, the extracting capability of the object greatly influences the tracking point instructions. For example, in the case that an object exists which is not able to be extracted because of various disturbances, the point within the object thereof is not displayed as a tracking point candidate, and the user does not instruct the point thereof as a tracking point.

Also, with extracting the object, there is a tendency generally for that which is assumed to be the object to be extracted with priority, but there are cases wherein even an object that few users would want to track, is important to a portion of users who want to track the object. Accordingly, in such a case, for a portion of users, there are situations wherein a point within the object that should be tracked is not available to be instructed as a tracking point.

It has been found desirable to enable a user to instruct the desired tracking point in a simple manner.

An image processing device according to an embodiment of the present invention includes: a tracking unit to track a predetermined point on an image as a tracking point, to correspond with an operation of a user; a display control unit to display the tracking point candidate serving as the tracking point candidates, which are greater in number than objects moving on the image and fewer than the number of pixels of the image, on the image; and a setting unit to set the tracking point candidates as the tracking points on the next frame of the tracking unit, corresponding to an operation by a user.

According to an embodiment of the present invention, an image processing method for an image processing device that performs tracking processing to track tracing points on an image, includes the steps of: tracking of a predetermined point on the image as a tracking point, to correspond with an operation of a user; displaying control of the tracking point candidate serving as the tracking point candidates, which are greater in number than objects moving on the image and fewer than the number of pixels of the image, on the image; and setting of the tracking point candidates as the tracking points on the next frame, corresponding to an operation by a user.

According to an embodiment of the present invention, a program to cause a computer to function as an image processing device which includes: a tracking unit to track a predetermined point on an image as a tracking point, to correspond with an operation of a user; a display control unit to display the tracking point candidate serving as the tracking point candidates, which are greater in number than objects moving on the image and fewer than the number of pixels of the image, on the image; and a setting unit to set the tracking point candidates as the tracking points on the next frame of the tracking unit, corresponding to an operation by a user.

According to the above configuration, corresponding to user operations, predetermined points on an image are tracked as tracking points, and tracking point candidates, which serve as candidates for tracking points that are greater in number than the objects moving on the screen and fewer than the number of pixels in the image, are displayed on the image, and corresponding to the user operations, the tracking point candidates are set as tracking points for the next frame.

Thus, according to the above configurations, a user can easily instruct a desired tracking point.

DESCRIPTION OF THE PREFERRED EMBODIMENTS

Figure 1:
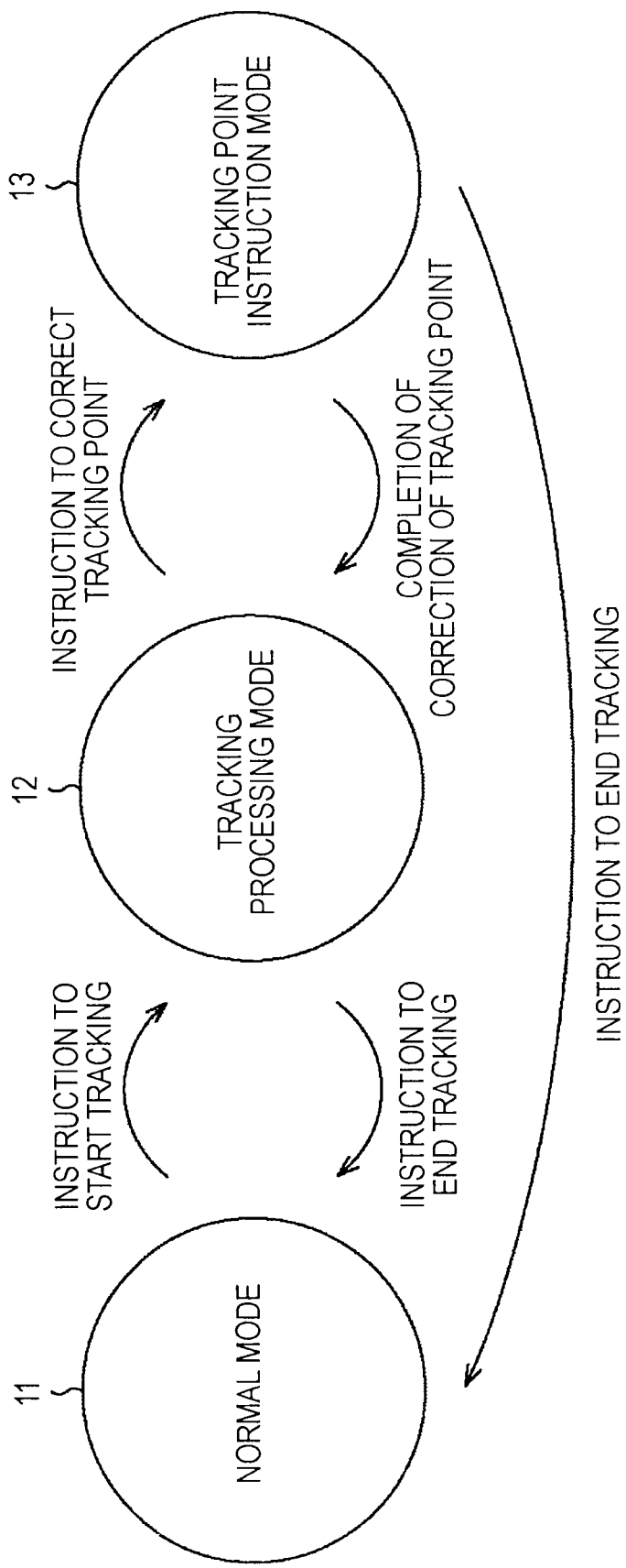
FIG. 1 is a diagram illustrating the transition of operating modes in a tracking system to which the present invention has been applied.

FIG. 1 is a diagram illustrating the transition of operating modes in a tracking system to which the present invention has been applied. As shown in FIG. 1, three operating modes are provided with the tracking system, which are a normal mode 11, tracking processing mode 12, and tracking point instruction mode 13.

The normal mode 11 is an operating mode to normally play an image. With the normal mode 11, when a user instructs the start of tracking, the operating mode 11 transitions from the normal mode 11 to the tracking processing mode 12.

The tracking processing mode 12 is an operating mode to perform tracking with the tracking point that the user instructed as an origin point. With the tracking processing mode 12, when the user instructs tracking point correction, the operating mode transitions from the tracking processing mode 12 to the tracking point instruction mode 13. On the other hand, with the tracking processing mode 12, when the user instructs the end of tracking, the operating mode transitions from the tracking processing mode 12 to the normal mode 11.

The tracking point instruction mode 13 is an operating mode to display on an image the tracking point candidates serving as candidates for a tracking point, which are greater in number than the objects moving on the image and fewer than the number of pixels of the image, and sets the tracking point candidate that the user has instructed on the image as the tracking point, as the tracking point in the next frame.

With the tracking point instruction mode 13, when the tracking point candidate is instructed by the user as a new tracking point, determination is made that correction of the tracking point is completed, and the operating mode transitions from the tracking point instruction mode 13 to the tracking processing mode 12. Note that even in the case that a predetermined time has passed without instruction of the tracking point being performed by the user, the operating mode may be transitioned from the tracking point instruction mode 13 to the tracking processing mode 12.

On the other hand, with the tracking point instruction mode 13, when the user instructs the end of tracking, the operating mode transitions from the tracking point instruction mode 13 to the normal mode 11.

Figure 2:
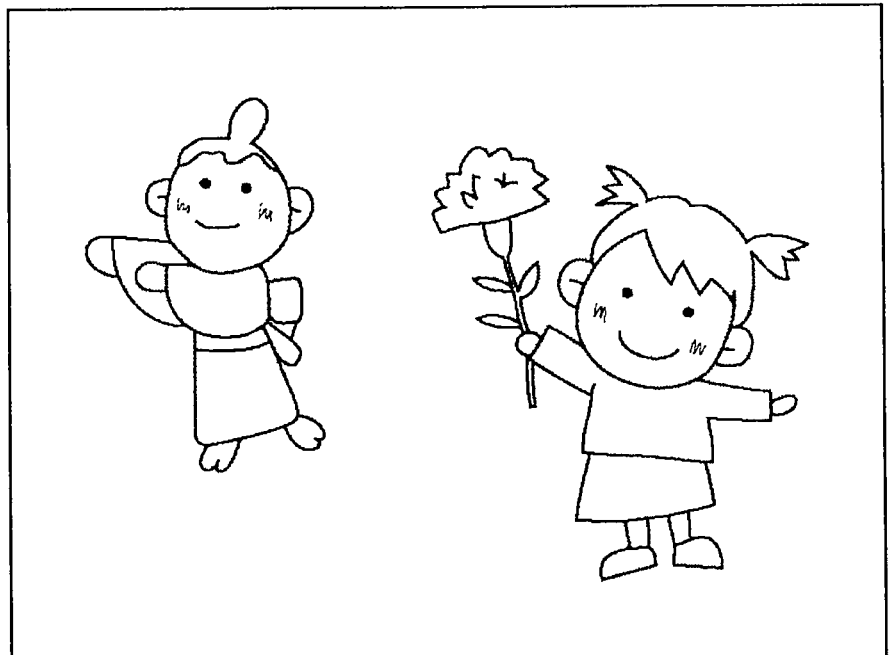
FIG. 2 is a diagram illustrating an example of an image displayed in normal mode.

Next, an example of an image displayed with the various modes will be described with reference to FIGS. 2 through 7. With the normal mode 11, as shown in FIG. 2, the playing image 21 is displayed without change. With the tracking processing mode 12 and tracking point instruction mode 13, a frame zoom mode and actual zoom mode are provided as display modes, and the user can select one of the two display modes.

Figure 3:
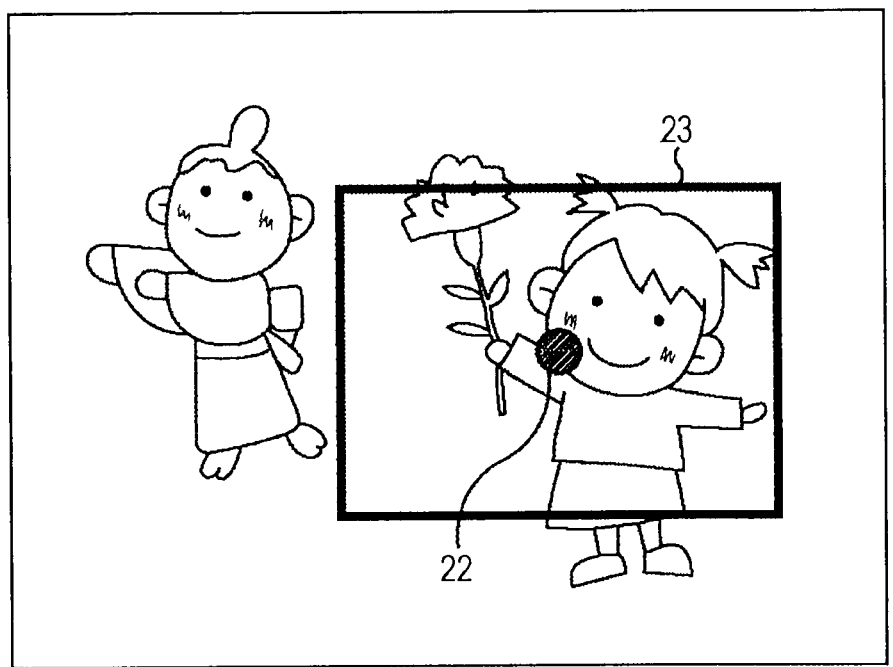
FIG. 3 is a diagram illustrating an example of an image displayed in tracking processing mode.

With the tracking processing mode 12, in the case that the display mode is the frame zoom mode, as shown in FIG. 3, the playing image 21 is displayed at the same magnification, and also a tracking point 22 and a zoom frame 23 with the tracking point 22 as the center thereof is displayed as OSD (On Screen Display). Note that the zoom frame 23 shows the size and position of a region subject to zooming, and is determined based on the position and zoom power of the tracking point 22. On the other hand, in the case that the display mode is the actual zoom mode, as shown in FIG. 4, a zoom image 31 of the playing image 21 within the zoom frame 23 corresponding to the tracking point 22 is displayed.

Figure 5:
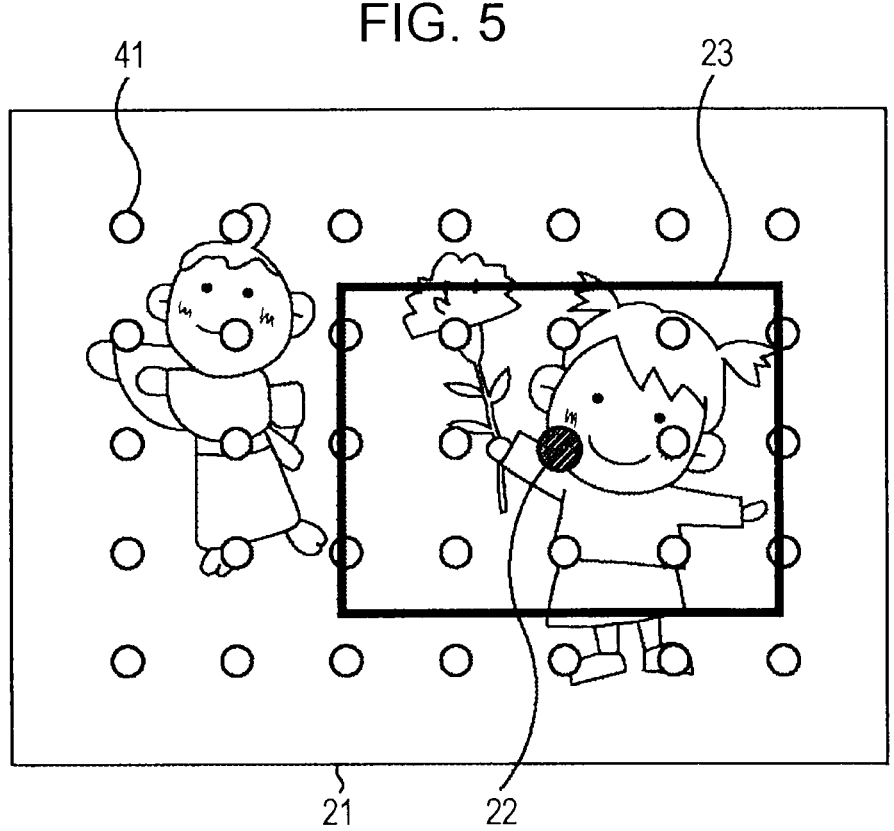
FIG. 5 is a diagram illustrating an example of an image displayed in tracking point instruction mode.

With the tracking point instruction mode 13, in the case that the display mode is the frame zoom mode, as shown in FIG. 5, the playing image 21 is displayed at the same magnification, and also the current tracking point 22 and zoom frame 23 and tracking point candidate 41 are displayed as OSD. In the example in FIG. 5, 5×7 tracking point candidates 41 are provided uniformly over the playing image 21. With the tracking point instruction mode 13, the user instructs determination by moving the tracking point 22 in increments of tracking point candidates 41, thereby is able to instruct the desired tracking point candidate 41 as a new tracking point 22.

Figure 6:
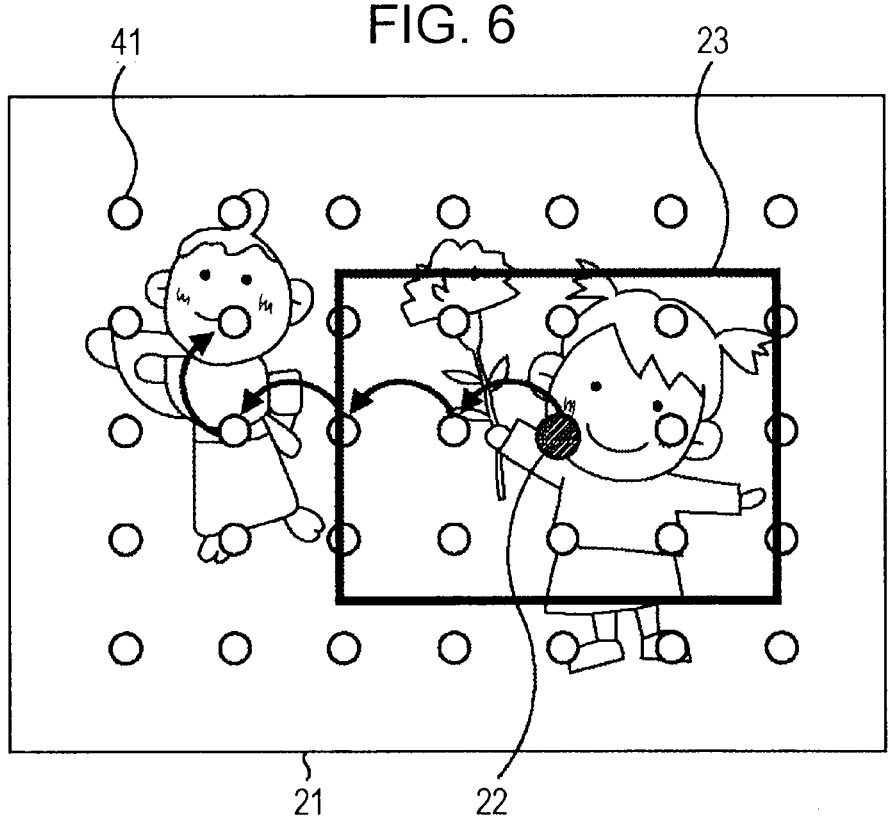
FIG. 6 is a diagram describing changes to a tracking point.
Figure 7:
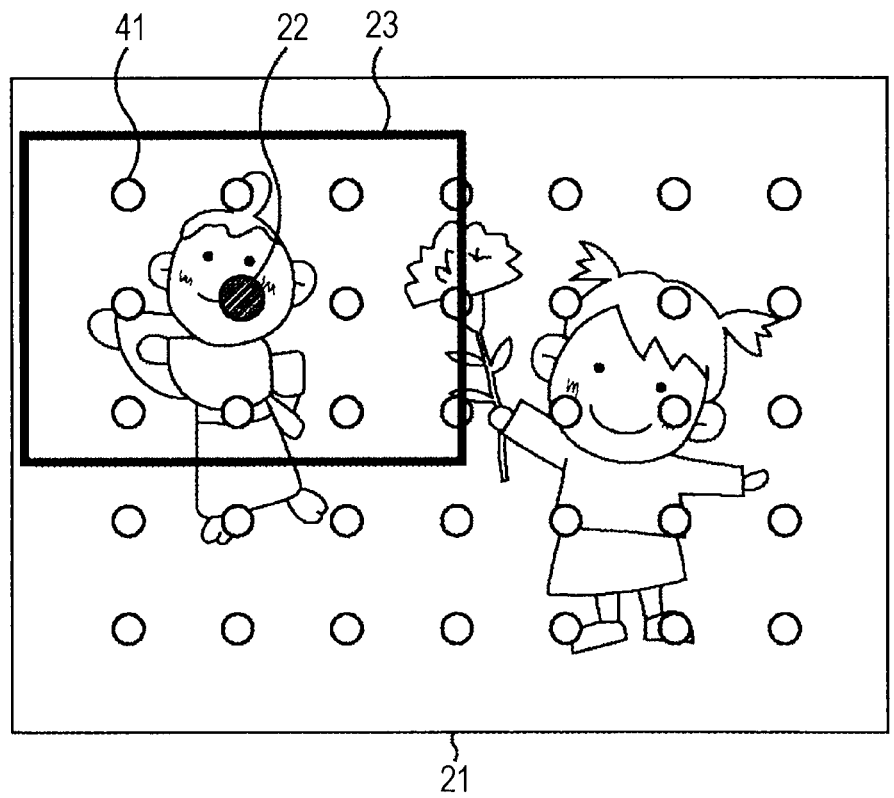
FIG. 7 is a diagram illustrating the tracking point after changes.

For example, as shown in FIG. 6, the user instructs determination by moving the tracking point 22 to the left 3 times and moving upwards twice, as shown in FIG. 7, the position of the tracking point 22 is changed to the position of the tracking point candidate 41 that is second from the left and second from the top. Also, the position of the zoom frame 23 is also changed corresponding to the position of the tracking point 22 thereof.

Figure 4:
FIG. 4 is a diagram illustrating another example of an image displayed in tracking processing mode.

Note that although omitted from the diagram, with the tracking point instruction mode 13, in the case that the display mode is the actual zoom mode, similar to the case of the frame zoom mode, the tracking point 22 and tracking point candidates 41 are displayed on the zoom image 31 in FIG. 4.

Thus, with the tracking point instruction mode 13, the tracking point candidates which are greater in number than the objects moving on the image and fewer than the number of pixels of the image are displayed, and the user can instruct the desired tracking point candidate within the displayed tracking point candidates, whereby the user can easily instruct the desired tracking point.

Conversely, in the case that tracking point candidates for just the number of objects moving on the image are displayed, e.g. in the case that an object exists that is not able to be extracted because of various distraction, or the object that should be tracked is only important to a portion of users and is therefore not extracted, there are situations wherein the user does not instruct the desired tracking point.

Also, in the case that the tracking point is instructable in increments of pixels, there is the advantage that fine adjustments of the tracking point can be performed.

However, then again for example, in the case that the user instructs a tracking point as to not a still image but a moving image wherein the object continuously moves, or in the case that the tracking point is instructed as to an image listened to the first time or just a few times, not an image that the content is familiar and the image content of the image played in real-time is read ahead and the tracking point is instructable, selecting the point to be the tracking point with precision in pixel increments is difficult, wherein instructing the desired tracking point is difficult.

Figure 8:
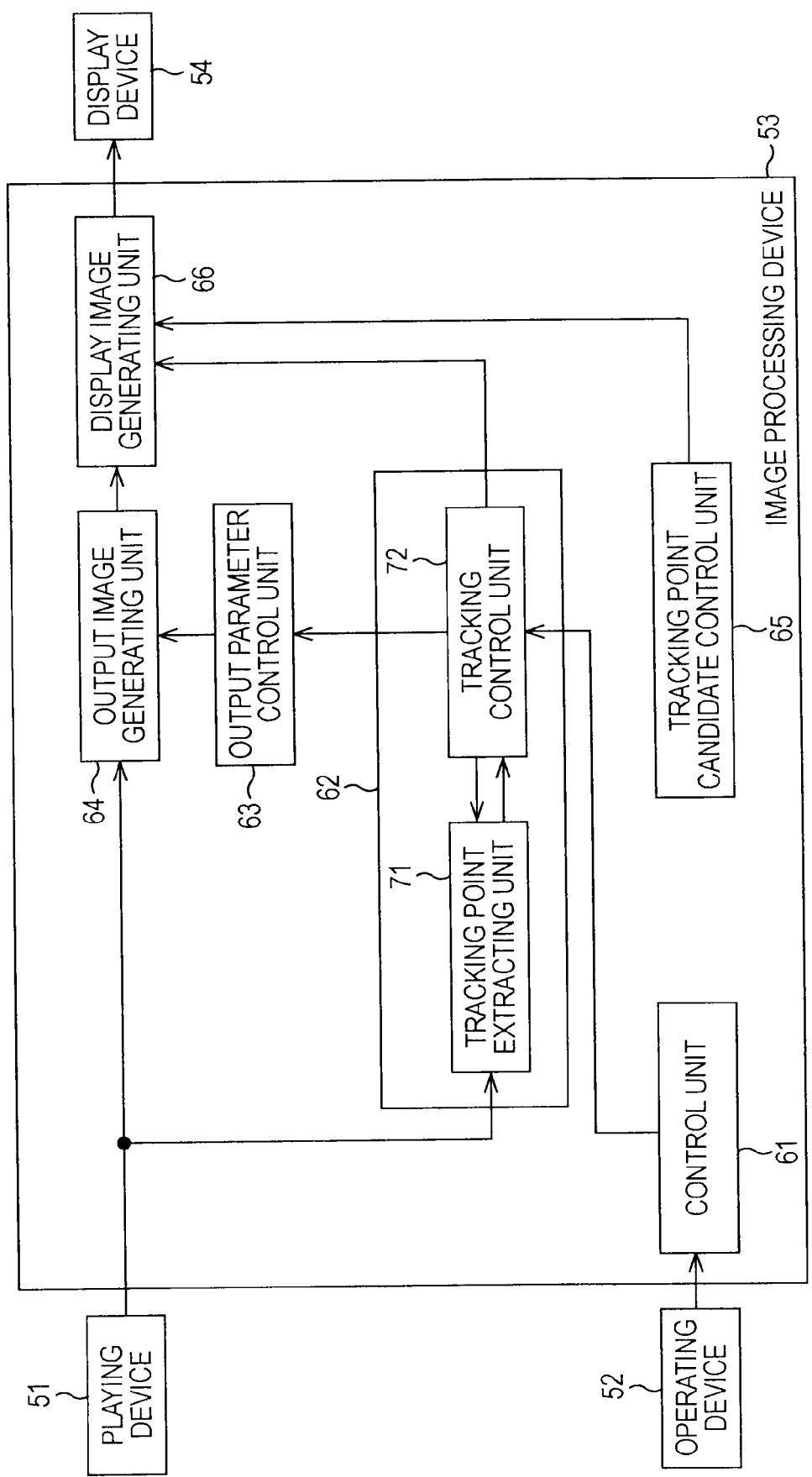
FIG. 8 is a block diagram illustrating a configuration example of an embodiment of a tracking system to which the present invention has been applied.

FIG. 8 shows a configuration of an embodiment of the tracking system to which the present invention has been applied. A tracking system 50 in FIG. 8 is made up of a playing device 51, operating device 52, image processing device 53, and display device 54, and performs processing as to the image played with the playing device 51 according to the operating mode described in FIG. 1, and displays the processing results on the display device 54.

Specifically, the playing device 51 is made up of a DVD (Digital Versatile Disc) player or the like, plays an image from a recording medium such as a DVD or the like, and inputs the image thereof in the image processing device 53 as a playing image in increments of frames.

The operating device 52 is made up of a remote controller or the like for example, and receives operations from the user. Specifically, for example, the user uses the operating device 52 to perform cursor operations, thereby moving the tracking point 22 in increments of tracking point candidates, as shown in FIG. 6, and instructs the desired tracking point candidate 41 as the tracking point. At this time, the operating device 52 receives cursor operating or instruction operations for tracking points. The operating device 52 then inputs the operating information showing the content of operation from the user in the image processing device 53.

The image processing device 53 is made up of a control unit 61, tracking processing unit 62, output parameter control unit 63, output image generating unit 64, tracking point candidate control unit 65, and display image generating unit 66.

Control unit 61 controls each portion according to the operating information input from the operating device 52. Specifically, the control unit 61 supplies tracking point instruction information expressing the position on the playing image of the tracking starting point instructed by the user and the position on the playing image of the tracking point candidates instructed as new tracking points, and control information expressing zoom power to the tracking control unit 72 (to be described later) of the tracking processing unit 62. Also, the control unit 61 sets the operating mode and display mode according to the operating information.

The tracking processing unit 62 is made up of a tracking point extracting unit 71 and tracking control unit 72, and starts when in tracking processing mode.

A tracking point extracting unit 71 performs tracking processing of tracking a tracking point. Specifically, the tracking point extracting unit 71 obtains a motion vector for the tracking point, based on the playing image currently input from the playing device 51, the playing image held of one frame previous thereto, and tracking point information expressing the position on the playing image of the tracking point supplied from the tracking control unit 72, and detects the position of the playing image of the tracking point within the playing image currently input from the playing device 51. The tracking point extracting unit 71 then supplies current tracking point information expressing the position on the playing image of the tracking point detected with the tracking processing to the tracking control unit 72.

The tracking control unit 72 determines the zoom frame, based on the zoom power expressed by the control information supplied from the control unit 61 and the current tracking point information supplied from the tracking point extracting unit 71. The tracking control unit 72 supplies the zoom frame information expressing the position and size of the zoom frame to the output parameter control unit 63.

Also, the tracking control unit 72 determines the tracking starting point or tracking point candidate corresponding to the tracking point instruction information expressed by the control information supplied from the control unit 61, or a tracking point corresponding to the current tracking point information as tracking point with the playing image of the next frame of the tracking point extracting unit 71. The tracking control unit 72 supplies the tracking point information of the tracking point thereof to the tracking point extracting unit 71. Further, the tracking control unit 72 supplies the current tracking point information and zoom frame information to the display image generating unit 66 when in frame zoom mode.

The output parameter control unit 63 starts when in tracking processing mode and tracking point instruction mode. The output parameter control unit 63 supplies the zoom frame information supplied from the tracking control unit 72 to the output image generating unit 64 as parameters to generate the output image (hereafter called output parameters), when in actual zoom mode.

The output image generating unit 64 supplies the playing image input from the playing device 51 as an output image without change, to the display image generating unit 66, when in normal mode and when in frame zoom mode. Also, when in actual zoom mode, the output image generating unit 64 generates a zoom image by performing DRC (Dynamic Range Compression) processing or the like as to the playing image, based on the zoom frame information serving as the output parameter supplies from the output parameter control unit 63. The output image generating unit 64 supplies the zoom image thereof to the display image generating unit 66 as an output image.

The tracking point candidate control unit 65 starts when in tracking point instruction mode. The tracking point candidate control unit 65 supplies the tracking point candidate information expressing the position on the output image of the tracking point candidate prepared beforehand to the display image generating unit 66. Note that the tracking point candidate information prepared beforehand expresses the positions on the output image at equal spacing. Accordingly, with the tracking system 50, the tracking point candidate is uniformly expressed on the output image.

The display image generating unit 66 superimposes an OSD image of the tracking point and zoom frame on the output image supplied from the output image generating unit 64, based on the current tracking point information and zoom frame information supplied from the tracking control unit 72. Further, when the operating mode is the tracking point instruction mode, the display image generating unit 66 superimposes the OSD image of the tracking point candidate on the output image wherein the OSD image of the tracking point and zoom frame are superimposed, based on the tracking point candidate information supplied from the tracking point candidate control unit 65.

First, the display image generating unit 66 superimposes the OSD image of the tracking point candidate on the output image based on the tracking point candidate information supplied from the tracking point candidate control unit 65 when in actual zoom mode with tracking point instruction mode, while superimposing the OSD image of the tracking point on the position of the tracking point candidate near the center of the output image.

The display image generating unit 66 outputs and displays the output image itself or the output image after superimposing to the display device 54 made up of a television receiving device or the like, as a display image.

Next, the image processing with the image processing device 53 in FIG. 8 will be described with reference to FIG. 9. The image processing is started when one frame of the playing image is input from the playing device 51, for example.

In step S11, the control unit 61 determines whether or not the current operating mode is the tracking processing mode. In step S11, in the case determination is made that the current operating mode is the tracking processing mode, in step S12 the image processing device 53 performs tracking processing mode processing to track the tracking point. The details of the tracking processing mode processing are described with reference to the flowchart in FIG. 10 to be described later.

On the other hand, in step S11, in the case determination is made that the current operating mode is not the tracking processing mode, in step S13 the control unit 61 determines whether or not the current operating mode is the tracking point instruction mode. In the case determination is made in step S13 that the current operating mode is the tracking point instruction mode, in step S14 the image processing device 53 performs tracking point instruction mode processing to set the tracking point candidate instructed by the user as a tracking point. The details of the tracking point instruction mode processing will be described with reference to the flowchart in the later-described FIG. 11.

Also, in the case determination is made in step S13 that the current operating mode is not the tracking point instruction mode, i.e. in the case the current operating mode is the normal mode, in step S15 the image processing device 53 performs normal mode processing to display the playing image without change as the display image on the display device 54. The details of the normal mode processing herein will be described with reference to the flowchart in the later-described FIG. 12.

Next, the details of the tracking processing mode processing of step S12 in FIG. 9 will be described with reference to the flowchart in FIG. 10.

In step S31, the tracking point extracting unit 71 performs tracking processing based on the image currently input from the playing device 51, the playing image held one frame prior thereto, and the tracking point information supplied from the tracking control unit 72. The tracking point extracting unit 71 supplies the current tracking point information obtained as a result thereof to the tracking control unit 72.

In step S32, the tracking control unit 72 determines the zoom frame based on the current tracking point information supplied from the tracking point extracting unit 71 and the zoom power expressed by the control information supplied from the control unit 61. The tracking control unit 72 then supplies the zoom frame information obtained as a result thereof to the output parameter control unit 63.

In step S33, the output parameter control unit 63 determines whether or not the current display mode is the actual zoom mode. In the case determination is made in step S33 that the current display mode is the actual mode, the output parameter control unit 63 supplies the zoom frame information supplied from the tracking control unit 72 to the output image generating unit 64 as an output parameter.

Subsequently, in step S34, the output image generating unit 64 generates the zoom image from the playing image, based on the zoom frame information serving as the output parameter supplied from the output parameter control unit 63. The output image generating unit 64 then supplies the zoom image thereof to the display image generating unit 66 as an output image.

In step S35, the display image generating unit 66 outputs and displays the output image itself supplied from the output image generating unit 64 to the display device 54 as the display image, and the processing is advanced to step S39.

On the other hand, in step S33, in the case determination is made that the current display mode is not the actual zoom mode, i.e. in the case determination is made that the currently display mode is the frame zoom mode, in step S36 the tracking control unit 72 supplies the current tracking point information and zoom frame information to the display image generating unit 66.

In step S37, the output image generating unit 64 outputs the playing image input from the playing device 51 without change as the output image to the display image generating unit 66. In step S38, the display image generating unit 66 superimposes the OSD image of the tracking point and zoom frame on the output image and generates a display image, based on the current tracking point information and zoom frame information supplied from the tracking control unit 72, and displays on the display device 54. The processing is then advanced to step S39.

In step S39, the control unit 61 determines whether or not the end of tracking processing has been instructed by the used, according to the operation information supplied from the operating device 52. In the case determination is made in step S39 that the end of tracking processing has been instructed, in step S40 the control unit 61 sets the current operating mode to the normal mode. The processing is then returned to step S12 in FIG. 9, and has ended.

On the other hand, in the case determination is made in step S39 that the end of the tracking processing has not been instructed, in step S41 determination is made as to whether or not the correction of the tracking point has been instructed by the user, according to the operating information supplied from the operating device 52.

In the case determination is made in step S41 that a correction of the tracking point is instructed, in step S42 the control unit 61 sets the current actually mode to the tracking point instruction mode, and the processing is advanced to step S43.

On the other hand, in the case determination is made in step S41 that a correction of the tracking point is not instructed, the flow proceeds to step S43, where the control unit 61 determines whether or not a change to the display mode is instructed by the user, according to the operating information supplied from the operating device 52.

In step S43, in the case determination is made that a change to the display mode is instructed by the user, the current display mode is changed from one of the actual zoom mode and frame mode to the other. The processing is then returned to step S12 in FIG. 9 and ended.

Figure 9:
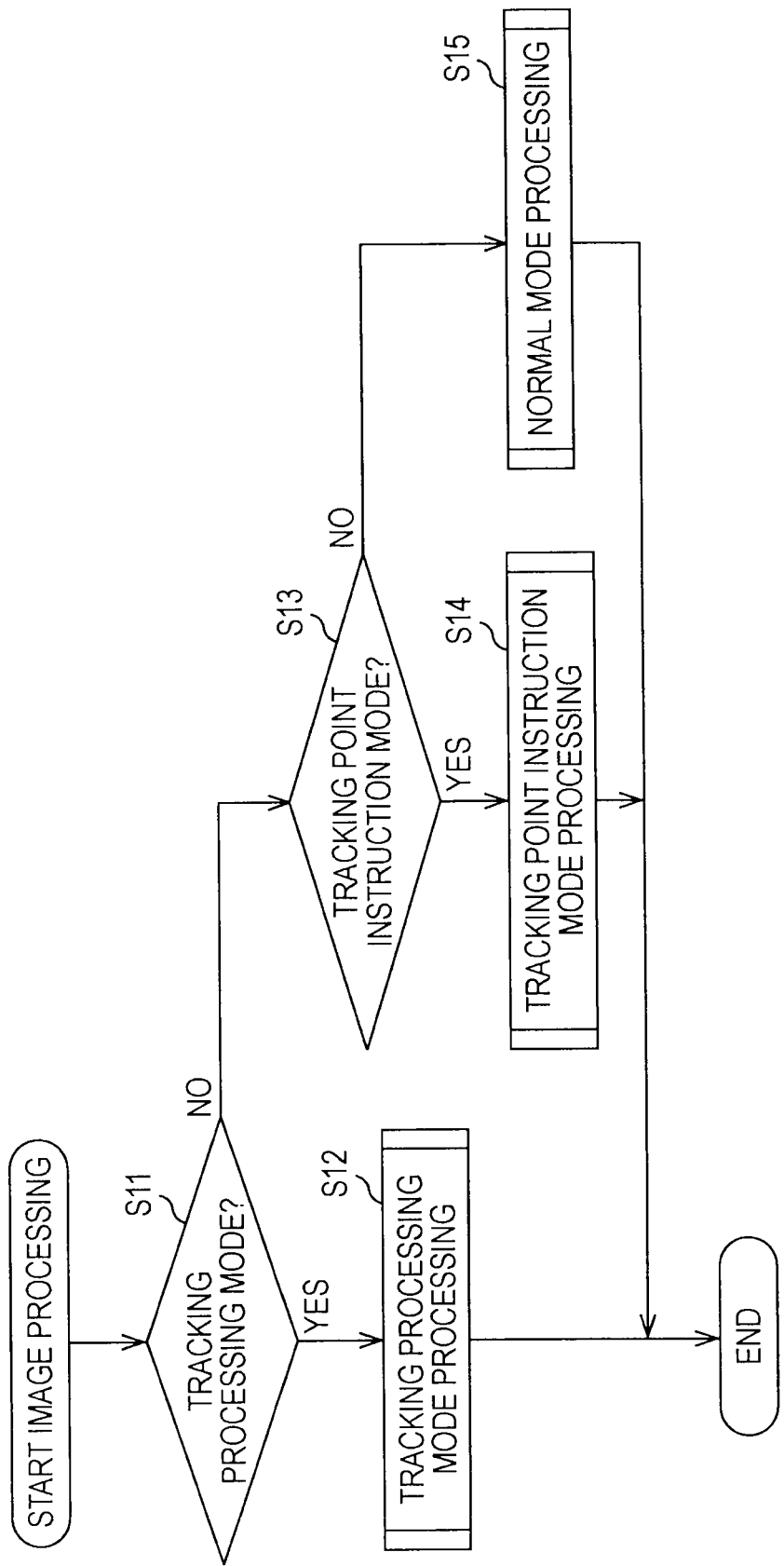
FIG. 9 is a flowchart describing image processing.
Figure 10:
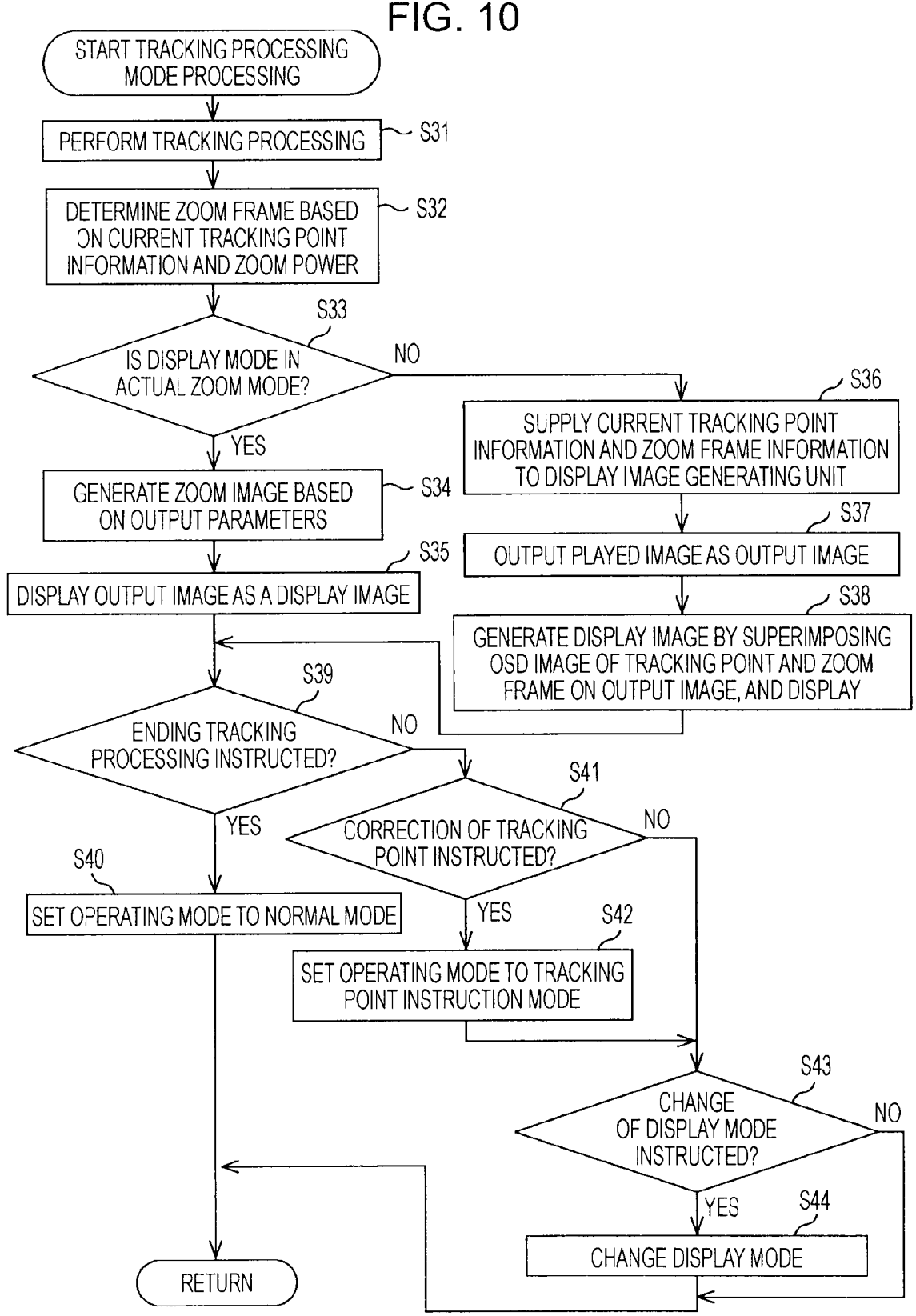
FIG. 10 is a flowchart describing in detail regarding the tracking processing mode processing in FIG. 9.

Also, in step S43 in the case determination is made that a change to the display mode is not instructed, the processing in step S44 is not performed, and the processing is returned to step S12 in FIG. 9 and ended.

Figure 11:
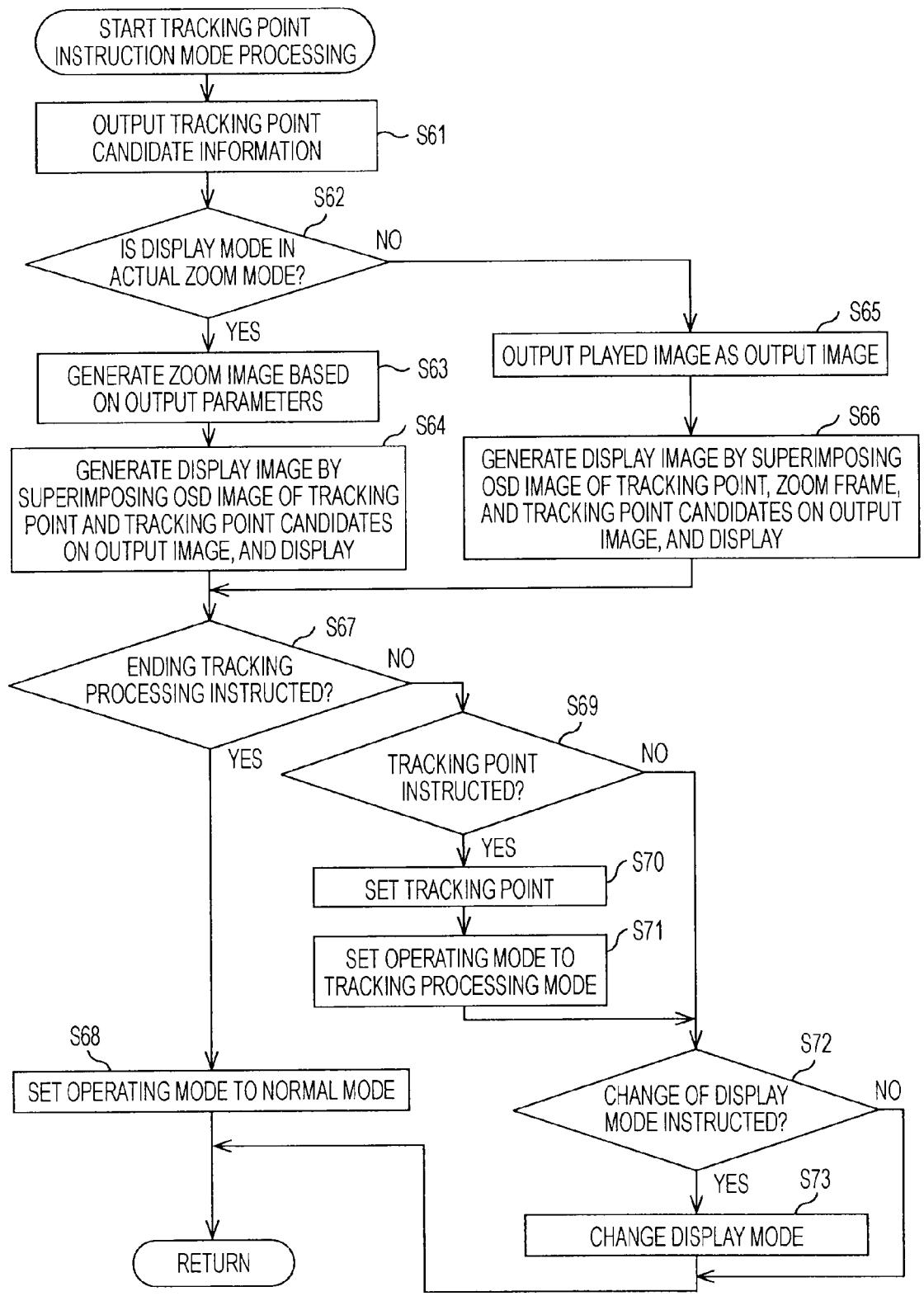
FIG. 11 is a flowchart describing in detail regarding the tracking point instruction mode processing in FIG. 9.

Next, details of the tracking point instruction mode in step S14 in FIG. 9 will be described with reference to the flowchart in FIG. 11.

In step S61, the tracking point candidate control unit 65 outputs the tracking point candidate information prepared before to the display image generating unit 66, and the processing is advanced to step S62. In step S62, the output parameter control unit 63 determines whether or not the current display mode is the actual zoom mode or not.

In step S62, in the case determination is made that the current display mode is the actual zoom mode, the output parameter control unit 63 supplies the zoom frame information supplied from the tracking control unit 72 to the output image generating unit 64 as the output parameters. In step S63, the output image generating unit 64 generates a zoom image from the playing image, based on the output parameters supplied from the output parameter control unit 63. The output image generating unit 64 supplies the zoom image thereof to the display image generating unit 66 as an output image.

In step S64, the display image generating unit 66 superimposes and OSD image of the tracking point and tracking point candidates on the output image supplied from the output image generating unit 64, based on the tracking point candidate information supplied from the tracking point candidate control unit 65, and displays on the display device 54. The processing is then advanced to step S67.

On the other hand, in the case determination is made that the current display mode is not an actual zoom mode, i.e. in the case the current display mode is the frame zoom mode, in step S65 the output image generating unit 64 outputs the playing image input from the playing device 51 without change to the display image generating unit 66 as an output image.

In step S66, the display image generating unit 66 superimposes the OSD image of the tracking point, zoom frame, and tracking point candidates on the output image and generates a display image, based on the zoom information supplied from the tracking control unit 72 and the tracking point candidate information supplied from the tracking point candidate control unit 65, and displays on the display device 54. The processing is then advanced to step S67.

In step S67, the control unit 61 determines whether or not the end of the tracking processing has been instructed, according to the operation information from the operating device 52. In the case determination is made in step S67 that the end of the tracking processing has been instructed, in step S68 the control unit 61 sets the current operating mode to the normal mode. The processing is then returned to step S14 in FIG. 9, and is ended.

On the other hand, in the case determination is made in step S67 that the end of the tracking processing has not been instructed, in step S69 the control unit 61 determines whether or not the tracking point candidate on the display image has been instructed by the user as the tracking point, according to the operation information supplied from the operating device 52.

In step S69, in the case determination is made that the tracking point candidate has been instructed as the tracking point, the control unit 61 supplies the tracking point instruction information of the tracking point candidate thereof to the tracking control unit 72. In step S70, the tracking control unit 72 sets the tracking point candidate corresponding to the tracking point instruction information thereof as the tracking point for the next frame. The tracking control unit 72 supplies the tracking point instruction information to the tracking point extracting unit 71 as the tracking point information.

In step S71, the control unit 61 sets the current operating mode to the tracking processing mode, and the processing is advanced to step S72. On the other hand, in the case determination is made in step S69 that the tracking point candidates on the display image is not instructed as a tracking point, the processing is advanced to step S72. The processing in steps S72 and S73 are similar to the processing in step S43 and S44 in FIG. 10, so the description will be omitted. After the processing in step S73, the processing is returned to the step S14 in FIG. 9, and is ended.

Figure 12:
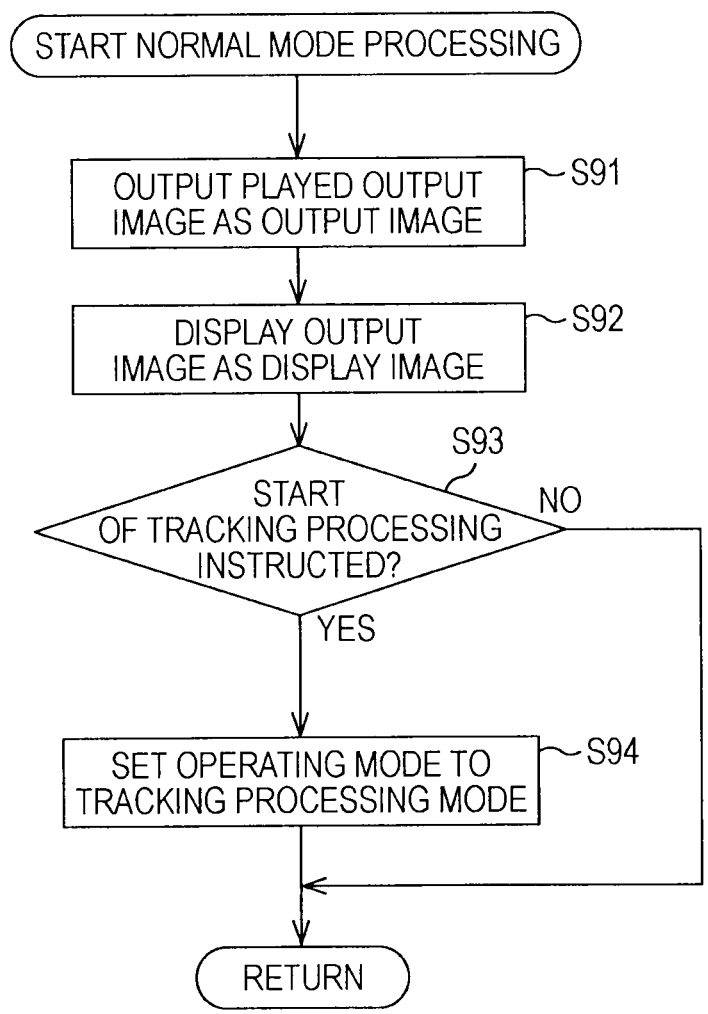
FIG. 12 is a flowchart describing in detail regarding the normal mode processing in FIG. 9.

Next, details of the normal mode processing in step S15 in FIG. 9 will be described with reference to the flowchart in FIG. 12.

In step S91, the output image generating unit 64 outputs the playing image input from the playing device 51 without change to the display image generating unit 66 as an output image. In step S92, the display image generating unit 66 displays the output image supplied from the output image generating unit 64 to the display device 54 without change as a display image.

In step S93, the control unit 61 determines whether or not the start of tracking processing has been instructed, according to the operating information supplied from the operating device 52. In the case determination is made in step S93 that the start of tracking processing has been instructed, the control unit 61 supplies the control information expressing the tracking point instruction information of the tracking starting point instructed as well as instruction of the start of tracking processing from the user to the tracking control unit 72, according to the operating information.

In step S94, the control unit 61 sets the current operating mode to the tracking processing mode, and the processing returns to step S15 in FIG. 9 and is ended. On the other hand, in the case determination is made in step S93 that the start of tracking processing has not been instructed, the processing is returned to step S15 in FIG. 9.

Note that with the above-described description, the tracking point candidates are placed uniformly in positions determined beforehand, not according to the playing image, but an arrangement may be made wherein the tracking point candidates are placed according to the playing image. A configuration example of a tracking system in such a case is shown in FIG. 13.

Figure 13:
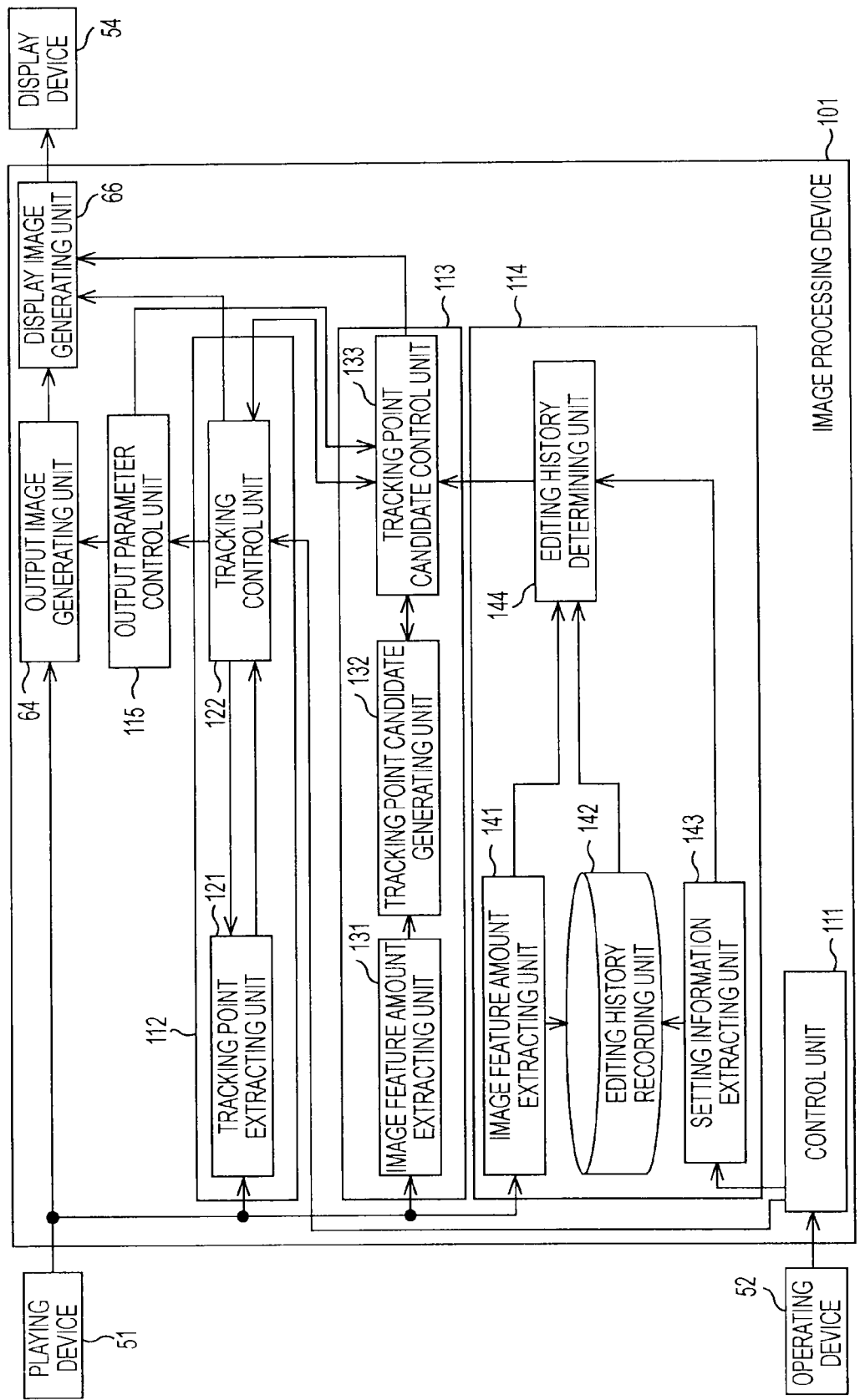
FIG. 13 is a block diagram illustrating a configuration example of another embodiment of the tracking system to which the present invention has been applied.
Figure 14:
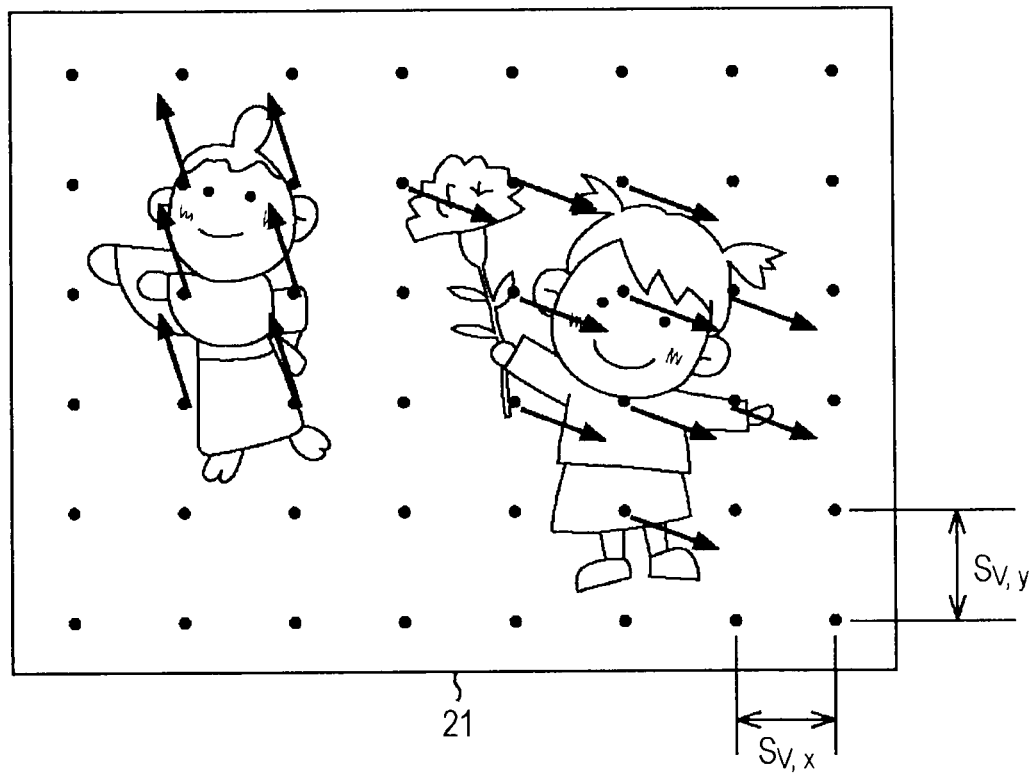
FIG. 14 is a diagram illustrating a sampling point.

The tracking system 100 in FIG. 13 is made up of a playing device 51, operating device 52, display device 54, and image processing device 101. With the tracking system 100, the tracking point candidates are placed according to the feature amount of the playing image, zoom frame information at the time of actual zoom mode, algorithm performance of tracking processing, and operating history as to the playing image in tracking point instruction mode. Accordingly, with the tracking system 100, the playing image is not input from the playing device 51, and as long as the case is not special such as a case wherein the playing image is completely black, the tracking point candidates are basically placed non-uniformly.

Note that in FIG. 13, components which are the same as those in FIG. 8 have been denoted with the same reference numerals, and accordingly redundant description thereof will be omitted.

In FIG. 13, the image processing device 101 is made up of the output image generating unit 64, display image generating unit 66, control unit 111, tracking processing unit 112, tracking point candidate processing unit 113, editing history processing unit 114, and output parameter control unit 115.

The control unit 111 controls each portion according to the operating information input from the operating device 52. Specifically, the control unit 111 supplies the control information showing the tracking point instruction information or zoom power to a tracking control unit 122 (described later) of the tracking processing unit 112 according to the operating information. Also, the control unit 111 sets the operating mode and display mode according to the operating information. Further, the control unit 111 supplies the operating information to the setting information extracting unit 143.

The tracking processing unit 112 is made up of the tracking point extracting unit 121 and tracking control unit 122, and starts when in tracking processing mode and when in tracking point instruction mode. In the case that the operating mode is the tracking point processing mode, the tracking point extracting unit 121 performs tracking processing based on the playing image input from the playing device 51 and the tracking point information supplied from the tracing control unit 122, similar to the tracking point extracting unit 71 in FIG. 8. The tracking point extracting unit 121 supplies the current tracking point information obtained as a result thereof to the tracking control unit 122.

Also, in the case the operating mode is the tracking point instruction mode, the tracking point extracting unit 121 computes the reliability of a fixed amount value to determine the reliability of whether or not tracking processing is accurately performed as to all of the temporary tracking point candidates determined with the tracking point candidate control unit 133 when the tracking point candidates thereof are instructed as a tracking point.

Specifically, the tracking point extracting unit 121 computes the reliability of a motion vector wheat expresses the reliability of whether or not an accurate motion vector is obtained when each tracking point candidate is instructed as a tracking point, based on the playing image input from the playing device 51 and the playing tracking point candidate information expressing the position on the playing image of all of the temporary tracking point candidates determined with the tracking point candidate control unit 133 supplied from the tracking control unit 122, for each tracking point candidate. The reliability of the motion vector herein is used for the later-described tracking point candidate control unit 133 to determine a final tracking point candidate according to the algorithm performance of the tracking processing.

Note that any type of method may be used as a method to compute reliability for a motion vector, any type of method may be used, but for example there is a method to compute vector precision in terms of reliability representing an evaluation value expressing a degree of matching between two blocks within the playing image corresponding to the motion vector and an activity expressing the feature amount of the complexity of the playing image. The details of computing of the vector precision are described in Japanese Unexamined Patent Application Publication No. 2005-310984.

The tracking point extracting unit 121 supplies the reliability for each computed tracking point candidate to the tracking control unit 122. Similar to the tracking control unit 72 in FIG. 8, the tracking control unit 122 determines the zoom frame based on the zoom power expressed by the control information supplied from the control unit 111 and the current tracking point information supplied from the tracking point extracting unit 121, and supplies the zoom frame information to the output parameter control unit 115.

Also, similar to the tracking control unit 72, the tracking control unit 122 determines the tracking starting point or tracking point candidates corresponding to the tracking point instruction information expressed by the control information supplied from the control unit 111 or the tracking point corresponding to the current tracking point information as the tracking point of the playing image of the next frame in the tracking point extracting unit 121. The tracking control unit 122 supplies the tracking point information of the tracking point information to the tracking point extracting unit 71.

Further, similar to the tracking control unit 72, the tracking control unit 122 supplies the current tracking point information and zoom frame information to the display image generating unit 66.

Also, the tracking control unit 122 supplies the playing tracking point candidate information for all of the temporary tracking point candidates supplied from the tracking point candidate control unit 133 to the tracking point extracting unit 121. Further, the tracking control unit 122 supplies the reliability for each of the temporary tracking point candidates supplied from the tracking point extracting unit 121 to the tracking point candidate control unit 133.

The tracking point candidate processing unit 113 is made up of an image feature amount extracting unit 131, tracking point candidate generating unit 132, and tracking point candidate control unit 133, and starts when in tracking point instruction mode.

The image feature amount extracting unit 131 uses two frames worth of playing image that are continuously input from the playing device 51 to perform block matching or the like, and obtains a motion vector for each sampling point provided for each predetermined sampling spacing on the playing image. The motion vector herein is used in order for the tracking point candidate generating unit 132 to determine the tracking point candidates according to the feature amount of the playing image. The image feature amount extracting unit 131 supplies the obtained motion vector to the tracking point candidate generating unit 132.

The tracking point candidate generating unit 132 determines the position of the tracking point candidates based on the motion vector supplied from the image feature amount extracting unit 131, and supplies the playing tracking point candidate information of the tracking point candidates to the tracking point candidate control unit 133. Also, the tracking point candidate generating unit 132 re-determines the position of the tracking point candidates according to a command to redo the determining of the positions of the tracking point candidates from the tracking point candidate control unit 133, and supplies the playing tracking point candidate information obtained as a result thereof to the tracking point candidate control unit 133.

The tracking point candidate control unit 133 commands the tracking point candidate control unit 122 to redo the determining of the positions of the tracking point candidate, based on the playing tracking point candidate information supplied from the tracking point candidate generating unit 132 and the zoom frame information serving as the output parameter supplied from the output parameter control unit 115 when in actual zoom mode, and changes the placement of the tracking point candidate.

Also, the tracking point candidate control unit 133 determines a temporary tracking point candidate from the tracking point candidates corresponding to the playing tracking point candidate information supplied from the tracking point candidate generating unit 132, based on the number of times of operating which is the number of times that the operation in order to instruct the tracking point is performed, and the zoom frame information, serving as operating history as to the playing image that is supplied from an editing history determining unit 144 (described later) of the editing history processing unit 14.

Subsequently, the tracking point candidate control unit 133 supplies the playing tracking point candidate information of the temporary tracking point candidates to the tracking control unit 122. As a result thereof, the reliability of the temporary tracking point candidate corresponding to the playing tracking point candidate information is computed from the tracking point extracting unit 121 for each temporary tracking point candidate, and the reliability there of supplied to the tracking point candidate control unit 133. The tracking point candidate control unit 133 determines a final tracking point candidate from the temporary tracking point candidate, based on the reliability for each temporary tracking point candidate supplied from the tracking point candidate control unit 133.

The reliability of the motion vector differs by algorithm performance of the tracking processing, whereby it can be said that the final tracking point candidate is determined from the temporary tracking point candidates, according to the algorithm performance of the tracking processing. The tracking point candidate control unit 133 supplies the tracking point candidate information of the final tracking point candidate to the display image generating unit 66.

The editing history processing unit 114 is made up of an image feature amount extracting unit 141, editing history recording unit 142, setting information extracting unit 143, and editing history determining unit 144, and starts when in tracking point instruction mode.

The image feature amount extracting unit 141 extracts the feature amount for editing history for each frame from the playing image input from the playing device 51, and supplies to the editing history recording unit 142 and editing history determining unit 144.

Note that as a feature amount for editing history, for example there is that which expresses the feature of a distribution pattern of a brightness value in the spatial direction of the playing image, a feature of a distribution pattern in the spatial direction of an intra-frame brightness difference absolute value, and further a temporal difference feature of a distribution pattern in the spatial direction of an intra-frame brightness difference absolute value.

The editing history recording unit 142 records a table correlating a feature amount for each frame supplied from the image feature amount extracting unit 141 and setting information expressing tracking point movement information, which expresses the position on the playing image of the tracking point candidate instructed as the moving destination of the tracking point as to the frame thereof supplied from the setting information extracting unit 143, and the zoom power, as an editing history table.

The setting information extracting unit 143 generates setting information based on the operating information supplied from the control unit 111, and supplies the setting information to the editing history recording unit 142 and editing history determining unit 144.

The editing history determining unit 144 searches for a feature amount that is the same as the feature amount supplied from the image feature amount extracting unit 141, of the feature amount registered in the editing history tale recorded in the editing history recording unit 142. The editing history determining unit 144 then determines whether or not the zoom frame corresponding to the setting information from the setting information extracting unit 143 (hereafter called current zoom frame) and the zoom frame corresponding to the searched setting information (hereafter called past zoom frame) overlap, based on the setting information supplied from the setting information extracting unit 143 and the setting information corresponding to the feature amount searched from the editing history table.

The editing history determining unit 144 supplies the number of the feature amounts searched from the editing history table as the number of times of operating to the tracking point candidate control unit 133, while supplying the zoom frame information of the current zoom frame to the tracking point candidate control unit 133.

The output parameter control unit 115 starts when in tracking processing mode and when in tracking point instruction mode, similar to the output parameter control unit 63 in FIG. 8. The output parameter control unit 115 supplies the zoom frame information supplied from the tracking control unit 122 to the output image generating unit 64 as an output parameter, similar to the output parameter control unit 63. Also, the output parameter control unit 115 supplies the zoom frame information supplied from the tracking control unit 122 to the tracking point candidate control unit 133 as an output parameter.

Next, the placement of the tracking point candidate according to the feature amount of the playing image with the tracking point candidate generating unit 132 in FIG. 13, with reference to FIGS. 14 through 19.

For example, upon the playing image 21 shown in FIG. 2 being input from the playing device 51, the image feature amount extracting unit 131 obtains the motion vector $(V_x, V_y)$ (however, $V_x$, $V_y$ is an integer) at the sampling point (black point in FIG. 14) provided for each of the sampling spacing on the playing image 21 $(S_{v,x}, S_{v,y})$, and supplies to the tracking point candidate generating unit 132.

The tracking point candidate generating unit 132 computes a frequency distribution of the motion vector supplied from the image feature amount extracting unit 131. Specifically, for example, in the case that the range of the motion vector to be obtained $(V_x, V_y)$ is $-32<V_x<32$, $-32<V_y<32$, then 65 (=32+1+32)×65 counters corresponding to each value of the motion vector $(V_x, V_y)$ are prepared.

The tracking point candidate generating unit 132 increments the value of the counter corresponding to the value of the motion vector $(V_x, V_y)$ supplied from the image feature amount extracting unit 131 by 1 at a time. For example, in the case that the value of the motion vector $(V_x, V_y)$ supplied from the image feature amount extracting unit 131 is (10, 10), the tracking point candidate generating unit 132 increments the value of the counter corresponding to (10, 10) by 1. Accordingly, the tracking point candidate generating unit 132 can recognize the frequency distribution of the motion vector $(V_x, V_y)$ with the value of each counter.

The tracking point candidate generating unit 132 detects an object region which is a region of an object moving within the playing image 21, based on the frequency distribution herein and the motion vector $(V_x, V_y)$.

Specifically, in the case that each value of the motion vector $(V_x, V_y)$ is greater than a predetermined threshold, the frequency of the motion vector $(V_x, V_y)$ is of a governing frequency with the playing image 21, and the sampling points corresponding to the motion vector $(V_x, V_y)$ are concentrated in more than a predetermined number, the tracking point candidate generating unit 132 determines the sampling point (circle in FIG. 15) corresponding to the motion vector $(V_x, V_y)$ thereof to be the sampling point existing in the object region.

Figure 16:
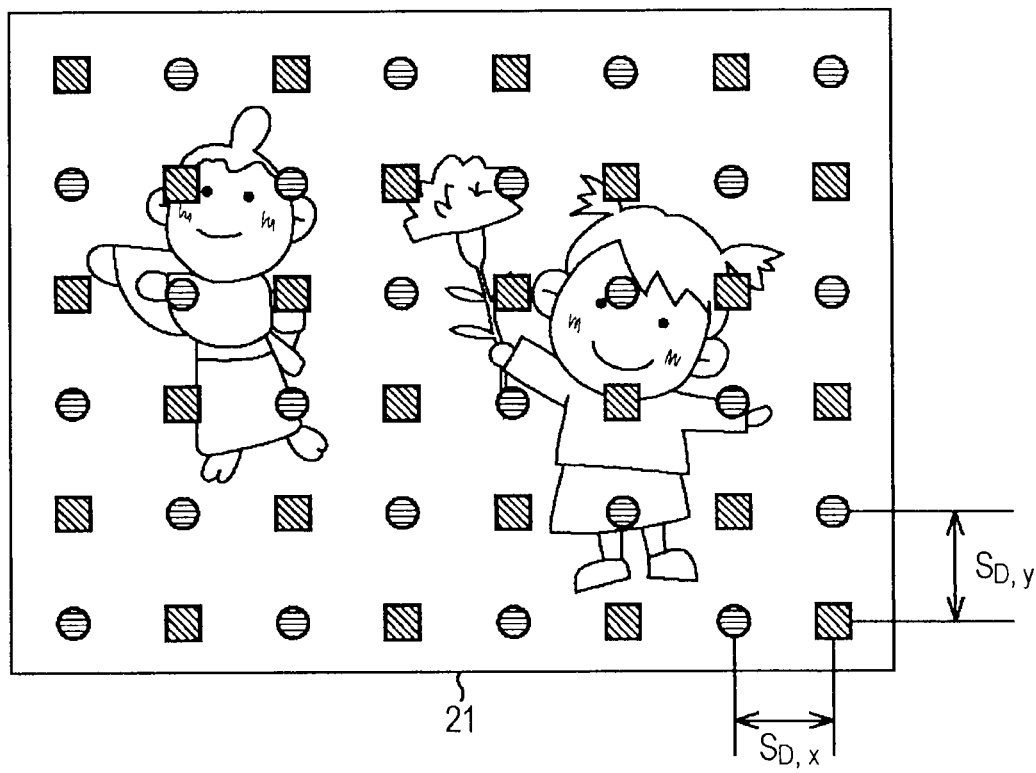
FIG. 16 is a diagram describing initialization of a tracking point candidate.

On the other hand, the tracking point candidate generating unit 132 first initializes the tracking point candidate, and uniformly places the tracking point candidates (circle and square in FIG. 16) on the playing image 21, as shown in FIG. 16. Note that with the example in FIG. 16, the spacing of the initialized tracking point candidates $(S_{D,x}, S_{D,y})$ are the same as the sampling spacing $(S_{v,x}, S_{v,y})$. Accordingly, the placement of the initialized tracking point candidates is the same as the placement of the sampling points.

Next, the tracking point candidate generating unit 132 causes every other initialized tracking point candidate to be the subject of object determination (determining point). That is to say, in the example in FIG. 16, the tracking point candidate expressed with a square in the diagram becomes the subject of object determining, and the tracking point candidate expressed with a circle in the diagram is not subject to object determining. Note that object determining is determining whether or not the tracking point candidate subject to determining exists in the object region.

In the case determination is made with the object determining that a tracking point candidate subject to determination exists in the object region, the tracking point candidate generating unit 132 retains the tracking point candidate thereof, and in the case determination is made of not existing in the object region, i.e. existing in the background region which is a region other than the object region, the tracking point candidate thereof is deleted.

Figure 15:
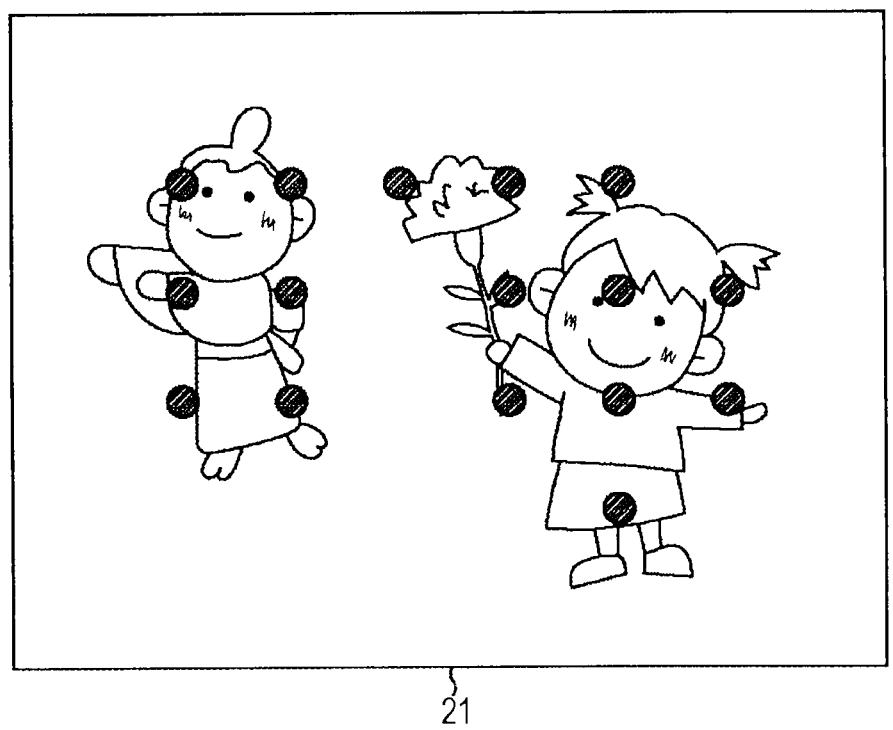
FIG. 15 is a diagram describing detection of an object region.
Figure 17:
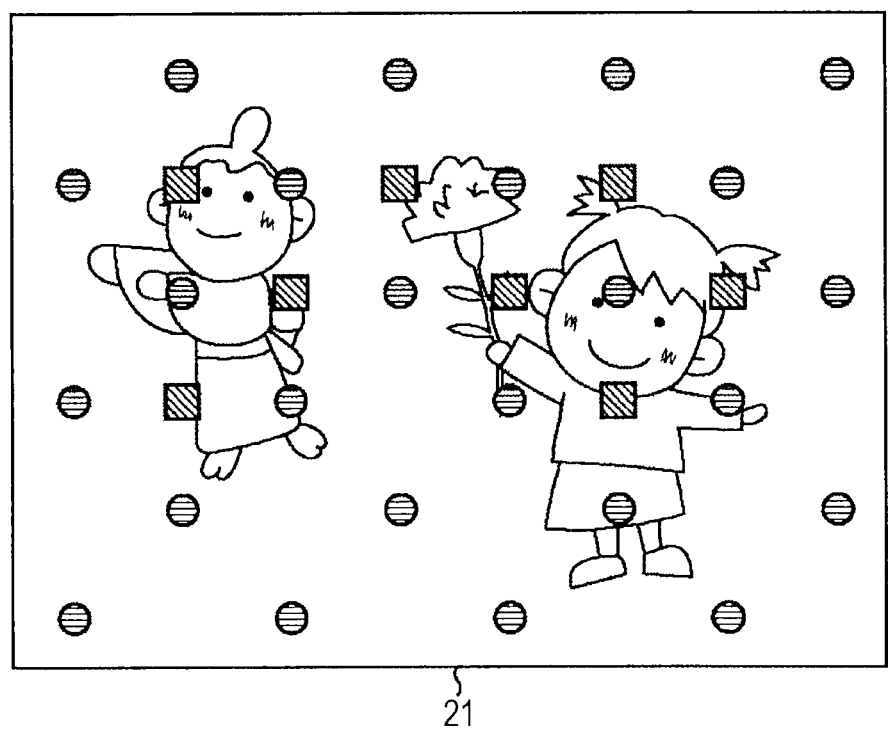
FIG. 17 is a diagram describing determination of a tracking point candidate.

Thus, as shown in FIG. 17, of the tracking point candidates subject to determining that are expressed with a square in FIG. 16, that which exists in the object region, i.e. that which is in the same position (square in FIG. 17) as the sampling point expressed with a circle in FIG. 15, is retained as a tracking point candidate. Also, as shown in FIG. 17, the tracking point candidate (circle in FIG. 16) that is not subject to determining is also retained as a tracking point candidate. Subsequently, the tracking point candidate generating unit 132 supplies the playing tracking point candidate information of the tracking point candidate retained that is expressed with a square in FIG. 18, to the tracking point candidate control unit 133.

Figure 19:
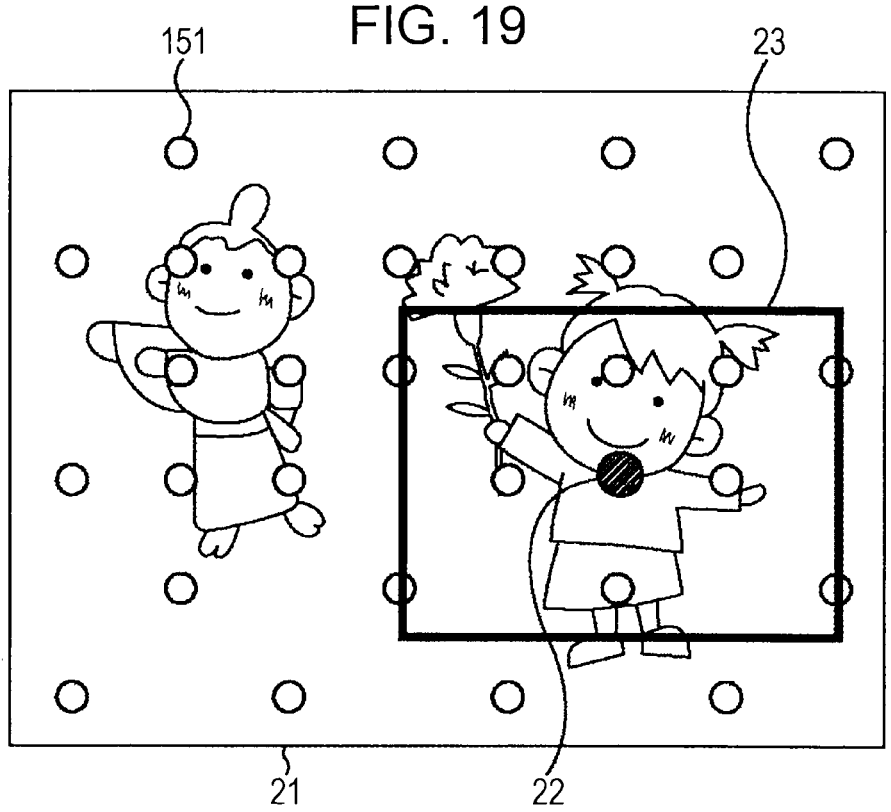
FIG. 19 is a diagram illustrating an example of an OSD display of a tracking point candidate.

Subsequently, for example upon the tracking point candidate control unit 133 determining the tracking point candidate supplied from the tracking point candidate generating unit 132 as a final tracking point candidate without change, as shown in FIG. 19 the tracking point candidates 151 are non-uniformly OSD-displayed on the playing image 21. Specifically, the tracking point candidate 151 within the object region is placed densely compared to the tracking point candidate 141 within the background region.

Thus, the tracking point candidates 151 are placed densely within the object region, whereby with an object having a high probability that is subject to be tracked, the user can generally instruct the tracking point with a fine precision. Also, the tracking point candidates 151 are also displayed in the background region, whereby even in a case that the detection precision for an object region is poor or in a case of desiring to track other than an object that is not subject to be tracked by a general user, the user can instruct a desired tracking point. As a result thereof, the usability of the user improves.

Next, the placement of the tracking point candidates according to the zoom frame information when in actual zoom mode with the tracking point candidate control unit 133 in FIG. 13 will be described with reference to FIGS. 20 and 21.

In the case that the display mode is the actual zoom mode, the tracking point candidate control unit 133 first determines the tracking point candidate information, based on the position expressed by the playing tracking point candidate information supplied from the tracking point candidate generating unit 132 and the zoom frame information serving as an output parameter.

Figure 18:
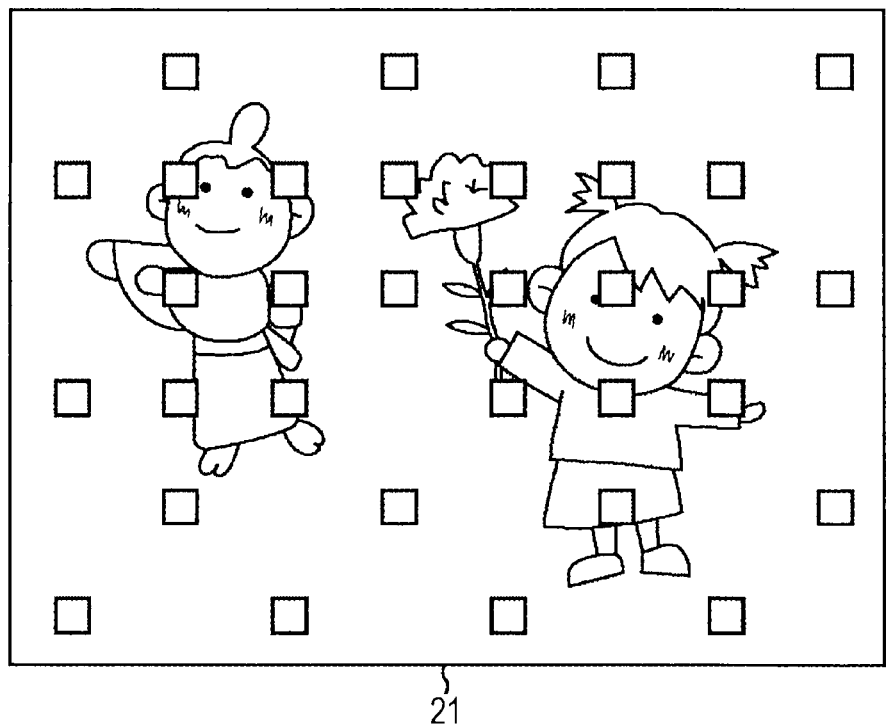
FIG. 18 is a diagram illustrating the determined tracking point candidate.
Figure 20:
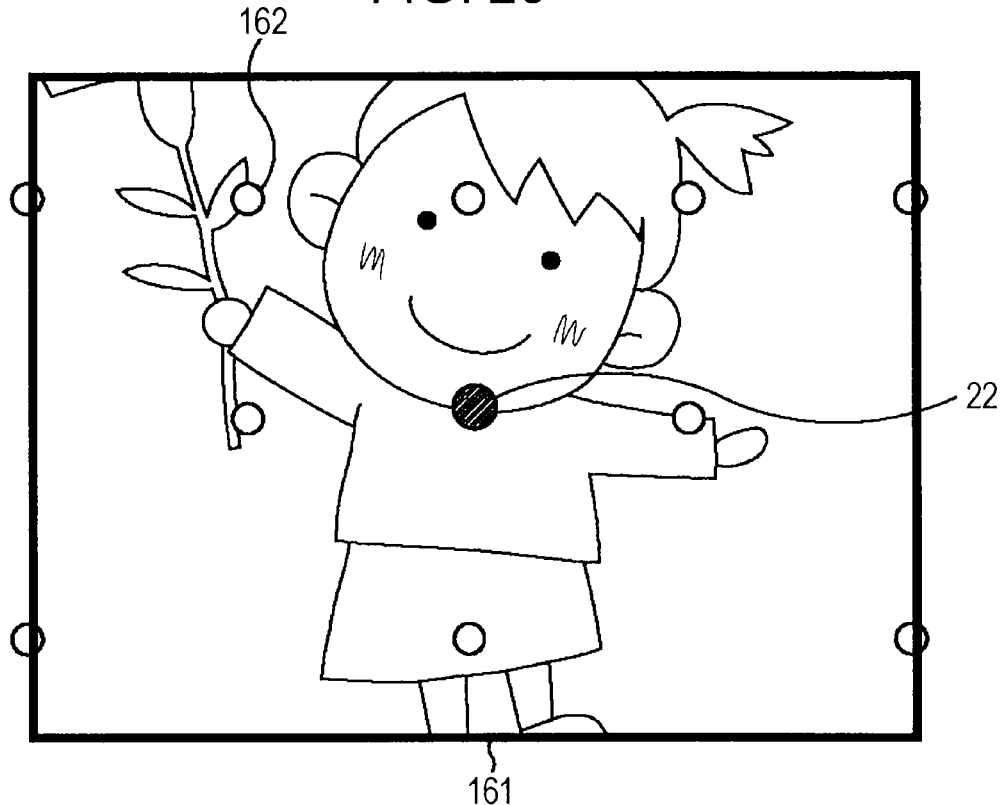
FIG. 20 is a diagram describing the determination of tracking point candidate information.
Figure 21:
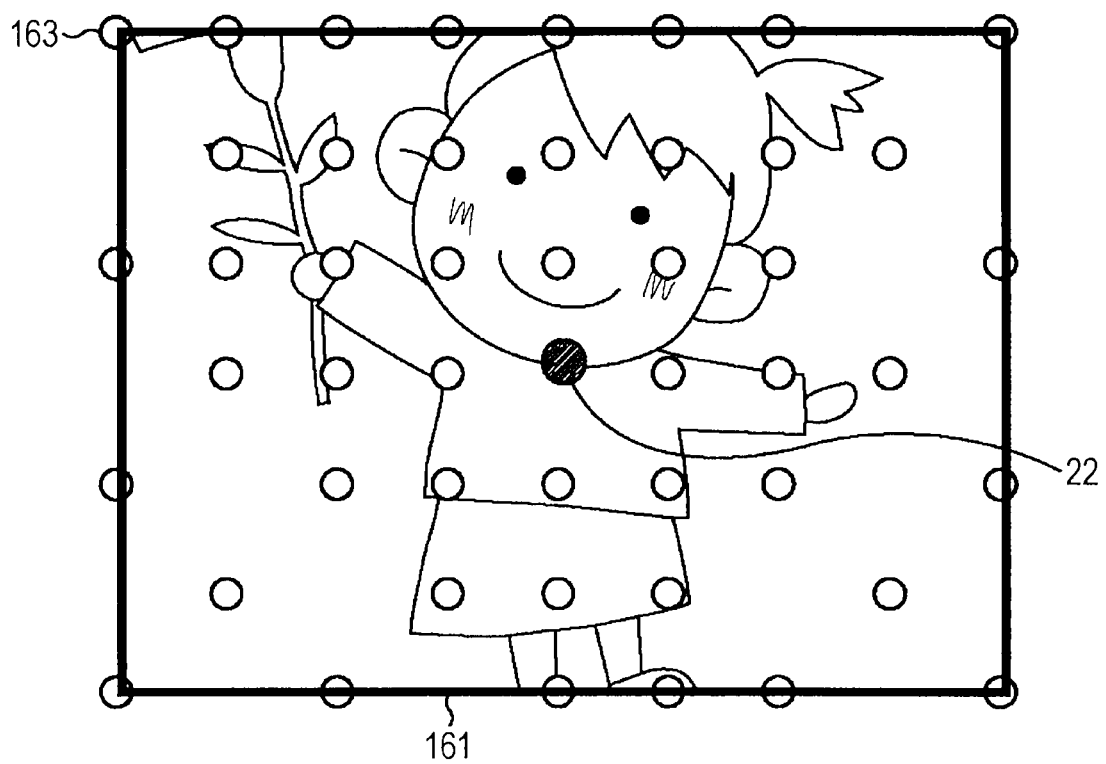
FIG. 21 is a diagram illustrating a tracking point candidate after a redo.

Specifically, for example in the case that the playing tracking point candidate information of the tracking point candidate shown in FIG. 18 is supplied from the tracking point candidate generating unit 132, the tracking point candidate control unit 133 changes the spacing of the tracking point candidate within the zoom frame of the tracking point candidates corresponding to the playing tracking point candidate information to the spacing according to the zoom power, based on the zoom frame information, as shown in FIG. 20.

For example, in the case that the zoom power is twice in the x-direction (horizontal direction) and is triple in the y-direction (vertical direction), the tracking point candidate control unit 133 causes the spacing of the tracking point candidate within the zoom frame in the x-direction to be twice, and the spacing in the y-direction to be triple.

However, as shown in FIG. 20, the position of the tracking point candidate 162 after spacing change is determined so that the relation of the output image 161 and the tracking point candidate 162 after change in spacing is the same as the relation of the playing image 21 and the tracking point candidates (squares in FIG. 18) within the zoom frame.

Thus, even in the case that the display mode is changed, but the position of the tracking point candidate as to the output image is not changed, whereby the user can instruct the tracking point with a sensation that does not change after change and before change of the display mode.

The tracking point candidate control unit 133 determines the tracking point candidate information such that the position of the tracking point candidate 162 wherein the spacing as changed as above becomes the position of the tracking point candidate on the output image 161.

Next, in the case that the number of tracking point candidates 162 is less than a predetermined number, the tracking point candidate control unit 133 commands a redo of the determining of the position of tracking point candidates to the tracking point candidate generating unit 132. The tracking point candidate generating unit 132 increases the number of tracking point candidates at the time of initializing with the spacing of the tracking point candidates at time of initializing at ½ or less, for example, according to the command herein. Thus, as shown in FIG. 21, the number of tracking point candidates 163 on the output image 161 is increased, and the number of tracking point candidates 162 is the predetermined number or greater.

As a result thereof, in the case that the zoom power is great, from the spacing of the tracking point candidates being too wide, the user not being able to instruct the desired tracking point can be prevented.

Note that the determination of a redo of determining the position of the tracking point candidates may use the zoom power, not the number of tracking point candidates. In this case, the control information expressing the zoom power is supplied from the control unit 111 to the tracking point candidate control unit 133.

Next, placement of the tracking point candidates according to the operating history as to the playing image with the tracking point candidate control unit 133 in FIG. 13 will be described with reference to FIGS. 22 through 27.

Figure 22A:
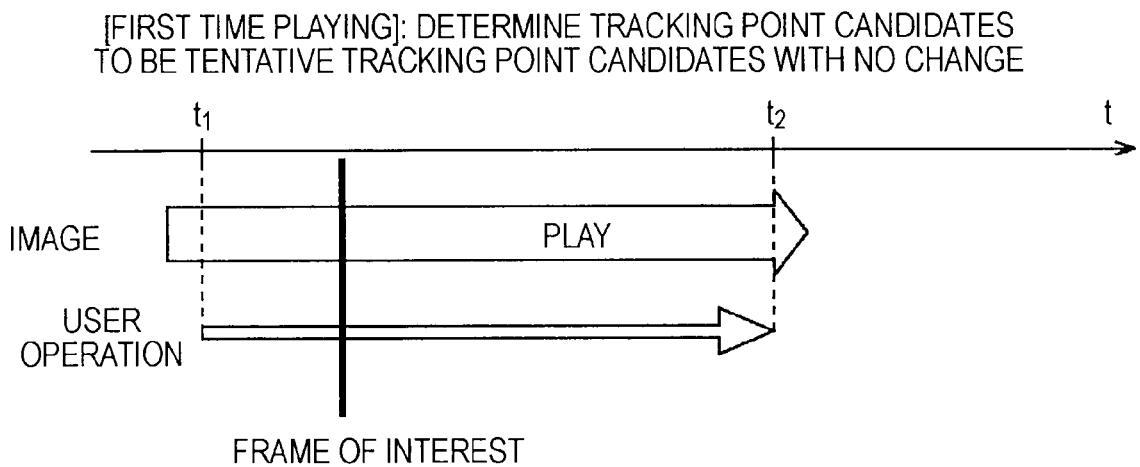
FIGS. 22A and 22B are diagrams describing the placement of a tracking point candidate according to operation history as to the playing image.

First, as shown in FIG. 22A, a case wherein the image from the playing device 51 is played for the first time with the user instructions, and during the playing image being played from playing point-in-time $t_1$ to playing point-in-time $t_2$ is tracking point instructing mode, will be described.

Figure 22B:
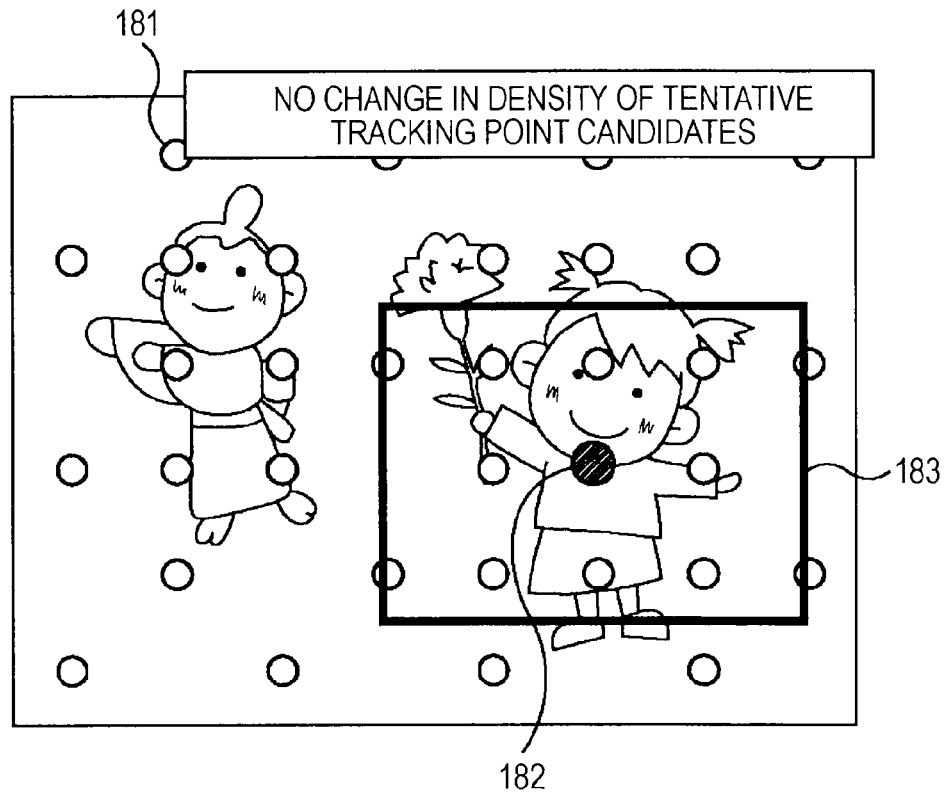

In this case, an operation is not yet performed as to the playing image from playing point-in-time $t_1$ to playing point-in-time $t_2$, whereby as shown in FIG. 22B, the temporary tracking point candidate 181 of the frame of interest, when each frame from playing point-in-time $t_1$ to playing point-in-time $t_2$ is the frame of interest, becomes the tracking point candidate itself that is determined by the tracking point candidate generating unit 132.

As shown in FIG. 22B, upon the user moving the tracking point 182 to a desired tracking point candidate in the vicinity of the object on the right side, out of the final tracking point candidates displayed in the output image of the frame of interest, the tracking point moving information of the tracking point 182 and zoom power as setting information are generated, and are registered in the editing history table along with the feature amount of each frame of interest. Note that the zoom frame 183 shown in FIG. 22B is determined based on the tracking point 182 and zoom power.

Figure 23A:
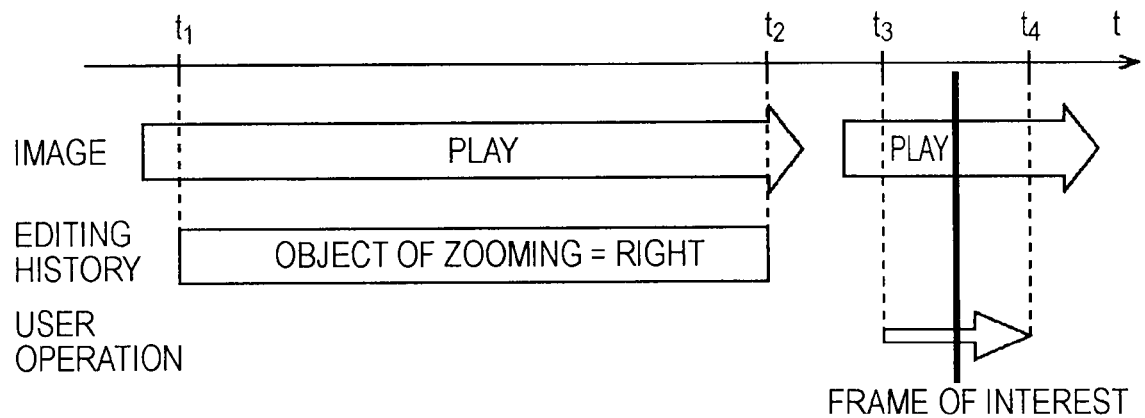
FIGS. 23A and 23B are diagrams describing the placement of a tracking point candidate according to operation history as to the playing image.

Subsequently, as shown in FIG. 23A, during the playing of the playing image from the playing point-in-time $t_3$ to the playing point-in-time $t_4$, the operating mode is the tracking point instructing mode. In this case also, similar to the case in FIG. 22, operating is not yet performed as to the playing image during the playing point-in-time $t_3$ to the playing point-in-time $t_4$, whereby as shown in FIG. 23B, the temporary tracking point candidate 191 in the frame of interest when each frame during the playing point-in-time $t_3$ to the playing point-in-time $t_4$ is the frame of interest becomes the tracking point candidate itself that is determined with the tracking point candidate generating unit 132.

Figure 23B:
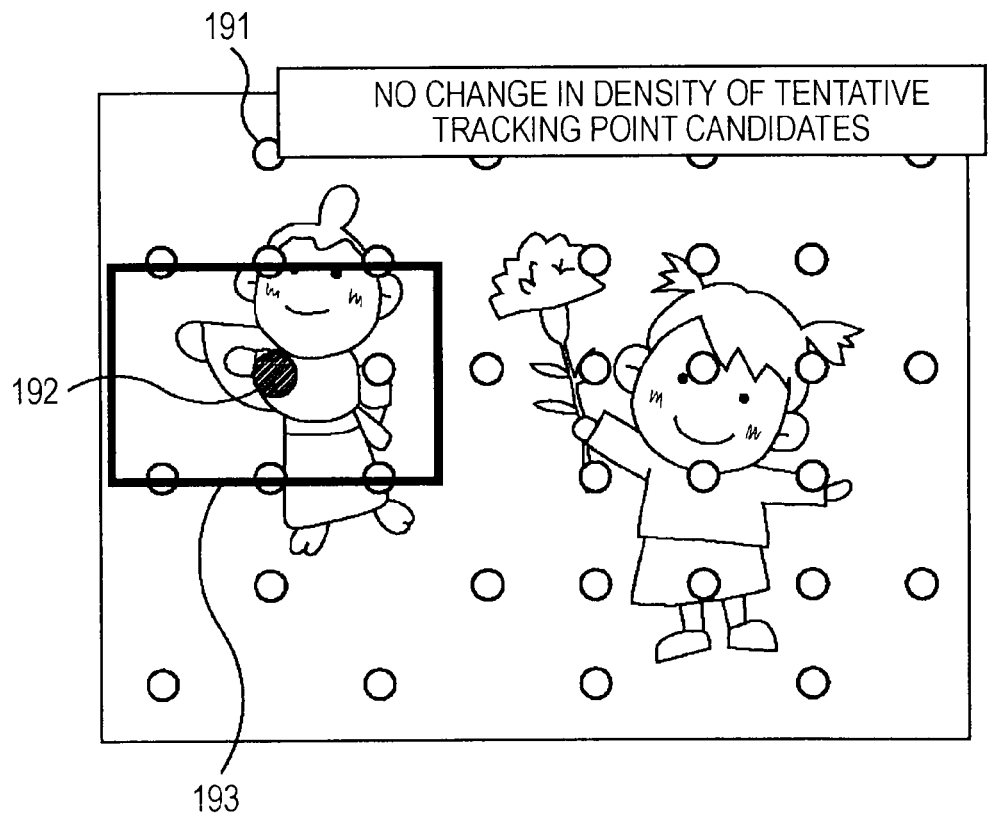

As shown in FIG. 23B, upon the user moving the tracking point 192 to a desired tracking point candidate in the vicinity of the object on the left side, out of the final tracking point candidates displayed in the output image of the frame of interest, the setting information expressing zoom power and the tracking point moving information of the tracking point 192 are registered in the editing history table along with the feature amount of each frame of interest. Note that the zoom frame 193 shown in FIG. 23B is determined based on the tracking point 192 and zoom power.

Figure 24A:
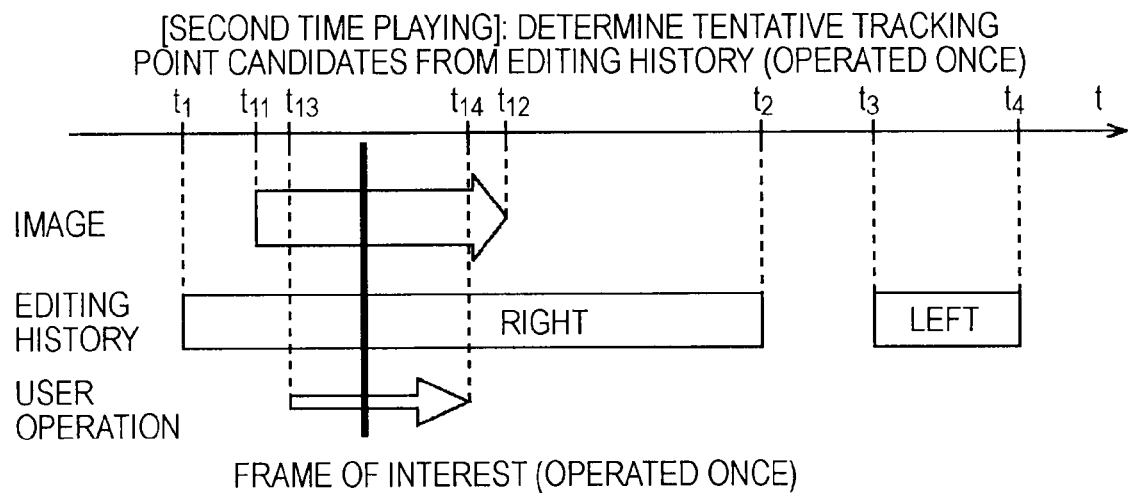
FIGS. 24A and 24B are diagrams describing the placement of a tracking point candidate according to operation history as to the playing image.

Next, the user instructs rewinding playing, and as shown in FIG. 24A, the frames from the playing point-in-time $t_{11}$ ($t_1 < t_{11} < t_2$) to the playing point-in-time $t_{12}$ ($t_{11} < t_{12} < t_2$) of the same image are played. At this time, during the playing of the playing image from the playing point-in-time $t_{13}$ ($t_{11} < t_{13} < t_{12}$) to the playing point-in-time $t_{14}$ ($t_{13} < t_{14} < t_{12}$), the operating mode is the tracking point instruction mode.

In the tracking point instruction mode, the user moves the tracking point to the final tracking point candidate in the vicinity of the object on the right side of the frame of interest when each frame from the playing point-in-time $t_{13}$ to the playing point-in-time $t_{14}$ is the frame of interest.

Figure 24B:
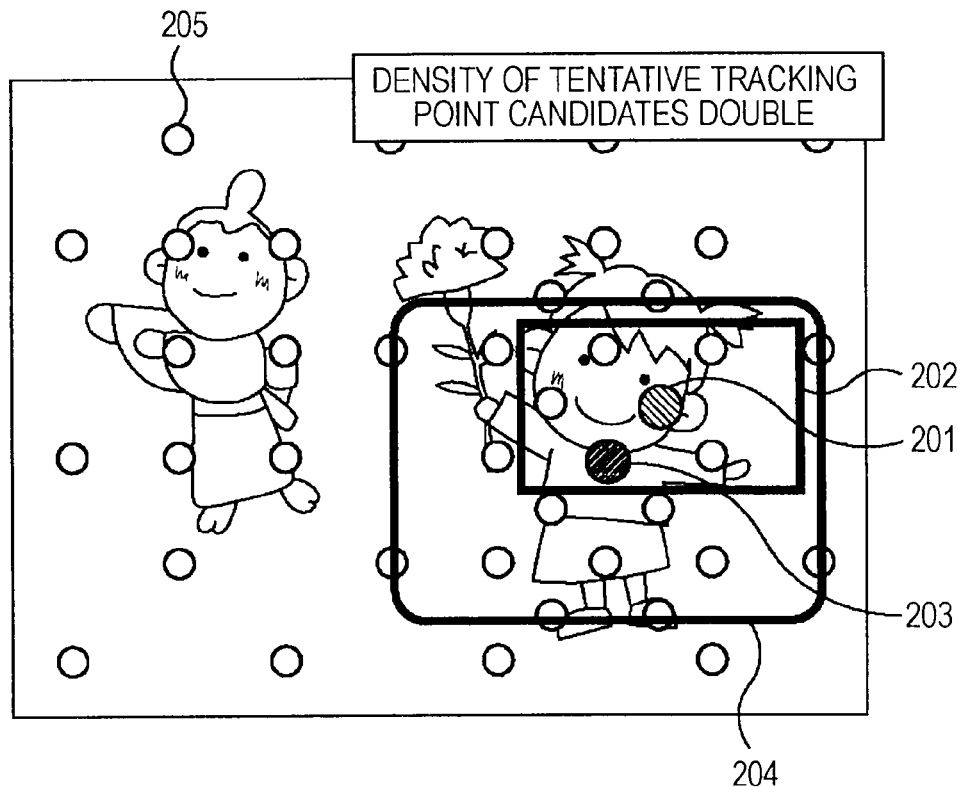

In this case, one operation has already been performed as to the playing image during the playing point-in-time $t_{13}$ to the playing point-in-time $t_{14}$. Also, the operation thereof is an operation to move the tracking point to the tracking point candidate in the vicinity of the object on the right side, whereby as shown in FIG. 24B, the tracking point 201 moved in one frame before the frame of interest during playing this time, and the current zoom frame 202 which is determined based on the zoom power, are overlapping with the tracking point moving information of the tracking point 203 moved with the first operation as to the frame of interest and the past zoom frame 204 corresponding to the setting information expressing the zoom power at the time of the first operation. That is to say, the current zoom frame 202 is within a predetermined range from the past zoom frame 204.

Note that with the example in FIG. 24B, the zoom power in one frame before the frame of interest during playing this time is set to be great compared to the time of the first operation as to the frame of interest, and the current zoom frame 202 is small compared to the base zoom frame 204.

As shown in FIG. 24B, in the case that the current zoom frame 202 is overlapping with the past zoom frame 204, the user is determined to have a strong interest in the object region near the current zoom frame 202 and past zoom frame 204, whereby the editing history determining unit 144 supplies one time as the number of operations as to the frame of interest, and the zoom frame information of the current zoom frame 202 to the tracking point candidate control unit 133.

The tracking point candidate control unit 133 generates a new tracking point candidate in between the adjacent tracking point candidates within the object region on the right side that is near the current zoom frame 202, of the tracking point candidates determined with the tracking point candidate generating unit 132, based on the number of times of operating and the zoom frame information, as shown in FIG. 24B, and includes in the temporary tracking point candidate 205. As a result thereof, the density within the object region near the current zoom frame 202 of the temporary tracking point candidate 205 is twice the density of the tracking point candidate determined with the tracking point candidate generating unit 132 within the object region thereof.

Also, the user instructs the final tracking point candidate in the vicinity of the object on the right side as to the frame of interest, whereby the tracking point moving information of the tracking point 201 and the setting information expressing zoom power are registered in the editing history table.

Figure 25A:
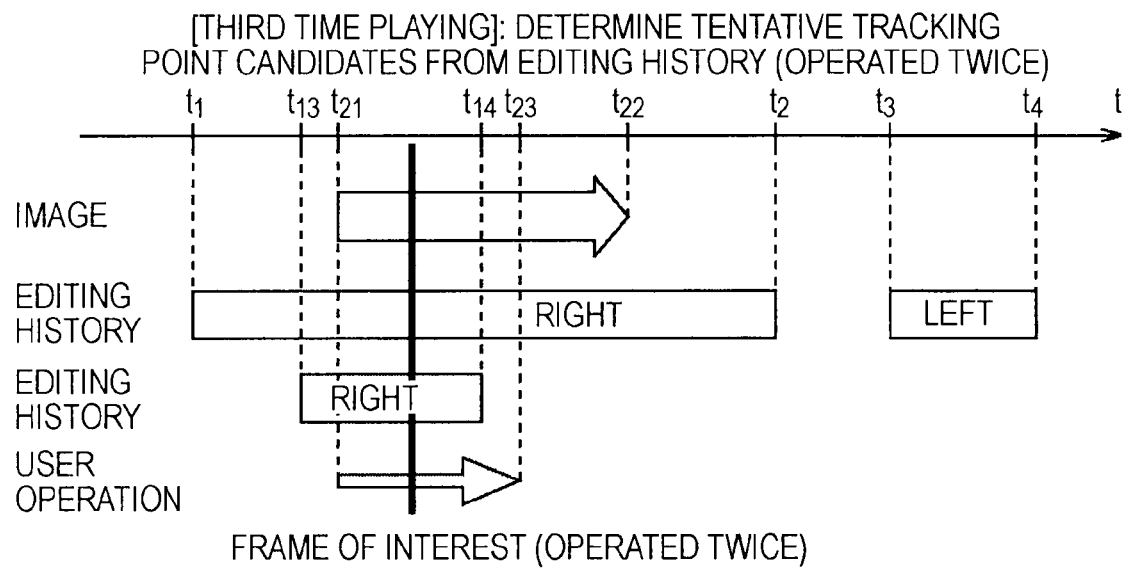
FIGS. 25A and 25B are diagrams describing the placement of a tracking point candidate according to operation history as to the playing image.

Next, the user further instructs rewinding playing, and as shown in FIG. 25A, the frames from the playing point-in-time $t_{21}$ ($t_{13} < t_{21} < t_{14}$) to the playing point-in-time $t_{22}$ ($t_{14} < t_{22} < t_2$) of the same image are played. At this time, during the playing of the playing image from the playing point-in-time $t_{21}$ to the playing point-in-time $t_{23}$ ($t_{14} < t_{23} < t_{22}$), the operating mode is the tracking point instruction mode.

The user moves the tracking point to the final tracking point candidate in the vicinity of the object on the right side of the frame of interest when each frame from the playing point-in-time $t_{21}$ to the playing point-in-time $t_{22}$ is a frame of interest, when in tracking point instruction mode.

Figure 25B:
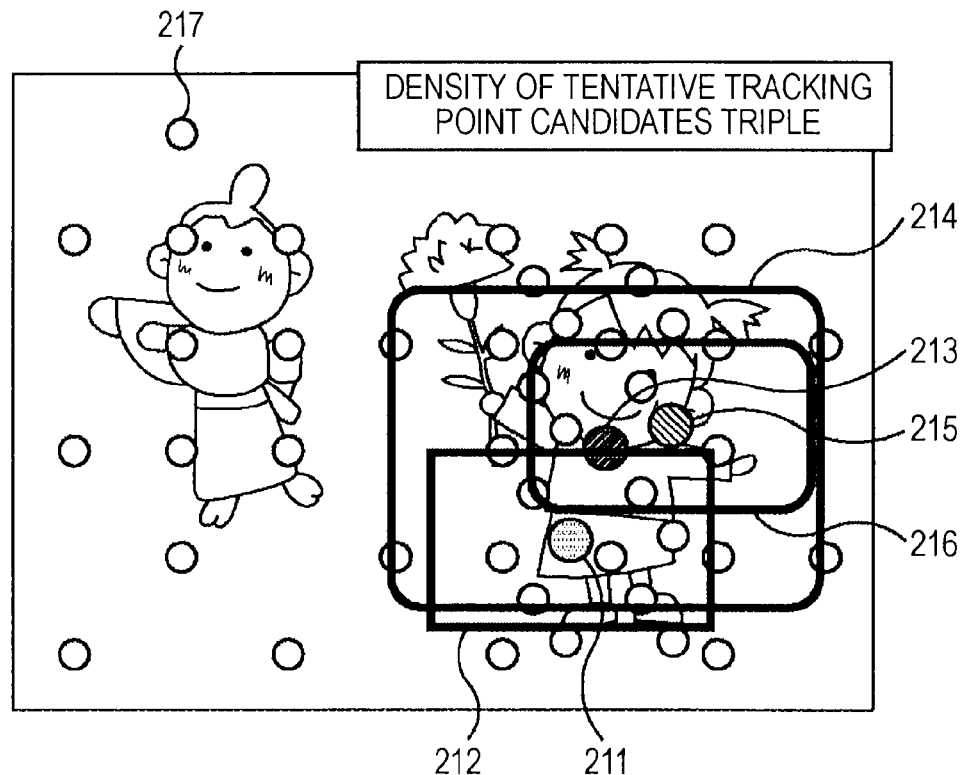

In this case, two operations have already been performed as to the playing image from the playing point-in-time $t_{21}$ to the playing point-in-time $t_{14}$. The operations thereof are operations to move the tracking point to the tracking point candidate in the vicinity of the object on the right side, whereby in the frame of interest from the playing point-in-time $t_{21}$ to the playing point-in-time $t_{14}$, as shown in FIG. 25B, the tracking point 211 that is moved in one frame before the frame of interest during playing this time and the current zoom frame 212 determined based on the zoom power are overlapped with the tracking point movement information of the tracking point 213 which is moved with the first operation of the frame of interest and the past zoom frame 214 corresponding to the setting information expressing the zoom power at the time of first operation, and the tracking point movement information of the tracking point 215 which is moved with the second operation of the frame of interest and the past zoom frame 216 corresponding to the setting information expressing the zoom power at the time of second operation.

Accordingly, similar to the case in FIGS. 24A and 24B, the editing history determining unit 144 supplies two times as the number of operations as to the frame of interest from the playing point-in-time $t_{21}$ to the playing point-in-time $t_{14}$, and the zoom frame information of the current zoom frame 212 to the tracking point candidate control unit 133.

With the tracking point candidate control unit 133, the density within the object region near the current zoom frame 212 of the temporary tracking point candidate 217 in the frame of interest from the playing point-in-time $t_{21}$ to the playing point-in-time $t_{14}$, becomes triple the density of the tracking point candidates determined with the tracking point candidate generating unit 132 within the object region thereof, based on the number of times of operations and zoom frame information herein.

Note that from the playing point-in-time $t_{14}$ to the playing point-in-time $t_{23}$ also, similar processing is performed as the frame of interest from the playing point-in-time $t_{21}$ to the playing point-in-time $t_{14}$, but the number of times of operation is once, whereby the density of the tracking point candidates within the object region becomes twice.

Also, the user instructs the final tracking point candidate in the vicinity of the object on the right side as to the frame of interest as the moving destination of the tracking point 211, whereby the tracking point moving information of the tracking point 211 and the setting information expressing the zoom power, along with the feature amount o the frame of interest, are registered in the editing history table.

Figure 26A:
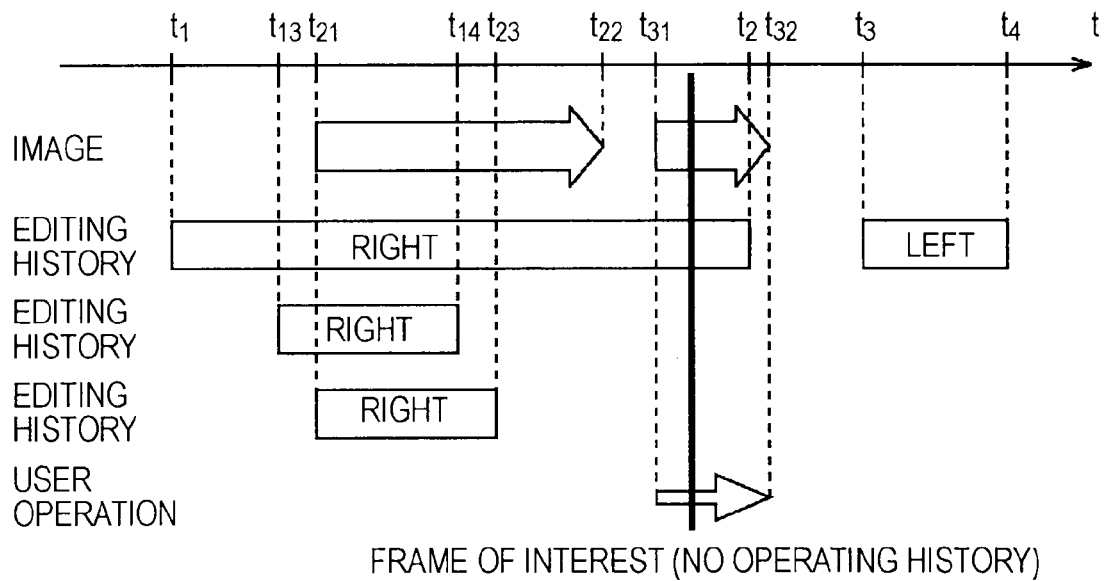
FIGS. 26A and 26B are diagrams describing the placement of a tracking point candidate according to operation history as to the playing image.

Subsequently, as shown in FIG. 26A, during the playing of the playing image from the playing point-in-time $t_{31}$ ($t_{22} < t_{31} < t_2$) to the playing point-in-time $t_{32}$ ($t_2 < t_{32} < t_3$), the operating mode is the tracking point instruction mode. The user then moves the tracking point to the tracking point candidate in the vicinity of the object on the left side of the frame of interest when each frame from the playing point-in-time $t_{31}$ to the playing point-in-time $t_{32}$ is a frame of interest. That is to say, the zoom frame is change from the right side to the left side at an earlier timing than the first operation shown in FIGS. 22 and 23.

In this case, one operation has already been performed as to the playing image during playing point-in-time $t_{31}$ to the playing point-in-time $t_2$. However, the operation thereof is an operation to move the tracking point to the tracking point candidate in the vicinity of the object on the right side, whereby the tracking point 221 moved in one frame before the frame of interest when playing this time and the current zoom frame 222 determined based on the zoom power do not overlap the tracking point movement information of the tracking point 223 moved with the first operation as to the frame of interest and the past zoom frame 224 corresponding to the setting information expressing the zoom power at time of the first operation.

Figure 26B:
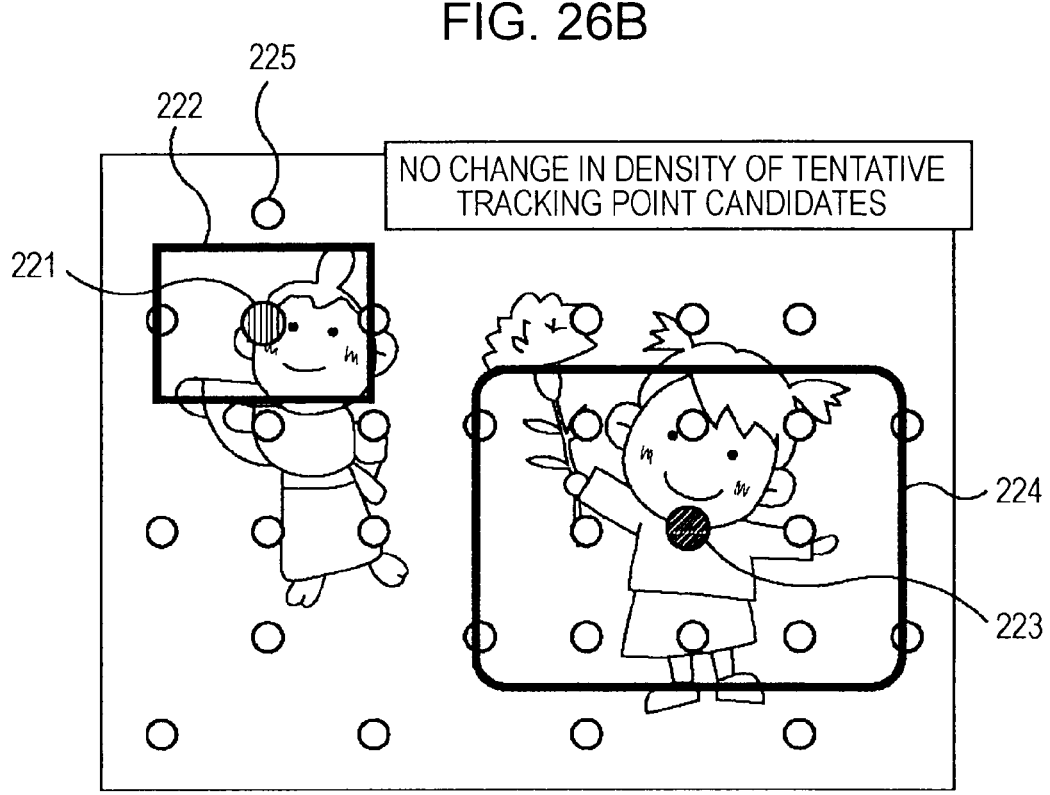

In such a case, a user most likely does not have a strong interest in the object region near the current zoom frame 222, whereby the editing history determining unit 144 supplies nothing to the tracking point candidate control unit 133. As a result thereof, as shown in FIG. 26B, the temporary tracking point candidate 225 in the frame of interest from the playing point-in-time $t_{31}$ to the playing point-in-time $t_2$ becomes the tracking point candidate itself by the tracking point candidate generating unit 132, similar to the case that no operation is performed as to such frame of interest.

Note that since no operation is performed with the frame of interest from the playing point-in-time $t_{31}$ to the playing point-in-time $t_2$, the tracking point candidate 225 becomes the tracking point candidate itself determined by the tracking point candidate generating unit 132, similar to the frame of interest from the playing point-in-time $t_{31}$ to the playing point-in-time $t_2$.

Also, the user instructs the final tracking point candidate in the vicinity of the object on the left side as to the frame of interest as the movement destination, whereby the tracking point movement information of the tracking point 221 and the setting information expressing the zoom power are registered in the editing history table along with the feature amount of the frame of interest.

Figure 27A:
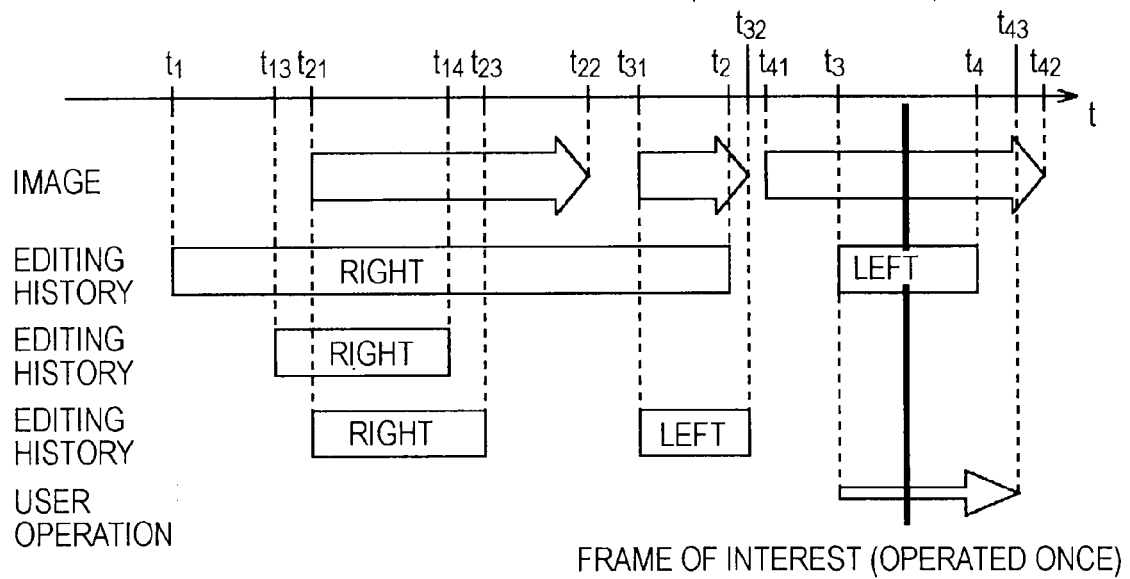
FIGS. 27A and 27B are diagrams describing the placement of a tracking point candidate according to operation history as to the playing image.

Subsequently, as shown in FIG. 27A, the frames from the playing point-in-time $t_{41}$ ($t_{32} < t_{41} < t_3$) to the playing point-in-time $t_{42}$ ($t_4 < t_{42}$) are played. At this time, during the time that the playing images from the playing point-in-time $t_3$ to the playing point-in-time $t_{43}$ ($t_4 < t_{43} < t_{42}$) are played, the operating mode becomes the tracking point instruction mode.

The user then moves the tracking point to the final tracking point candidate in the vicinity of the object on the left side of the frame of interest when each frame from the playing point-in-time $t_3$ to the playing point-in-time $t_{43}$ are played.

In this case, one operation has already been performed as to the playing image from the playing point-in-time $t_3$ to the playing point-in-time $t_4$. Also, the operation thereof is an operation for the purpose of moving the tracking point to the tracking point candidate in the vicinity of the object on the left side, whereby with the frame of interest from the playing point-in-time $t_3$ to the playing point-in-time $t_4$, as shown in FIG. 27B, the tracking point 231 that is moved in one frame before the frame of interest at time of playing this time and the current zoom frame 232 determined based on the zoom power overlap the tracking point movement information of the tracking point 233 that is moved with the first operation as to the frame of interest and the past zoom frame 234 corresponding to the setting information expressing the zoom power at time of the first operation.

Accordingly, similar to the case in FIGS. 24A and 24B, the editing history determining unit 144 supplies one time as the number of operations as to the frame of interest, and the zoom frame information of the current zoom frame 232 to the tracking point candidate control unit 133.

Figure 27B:
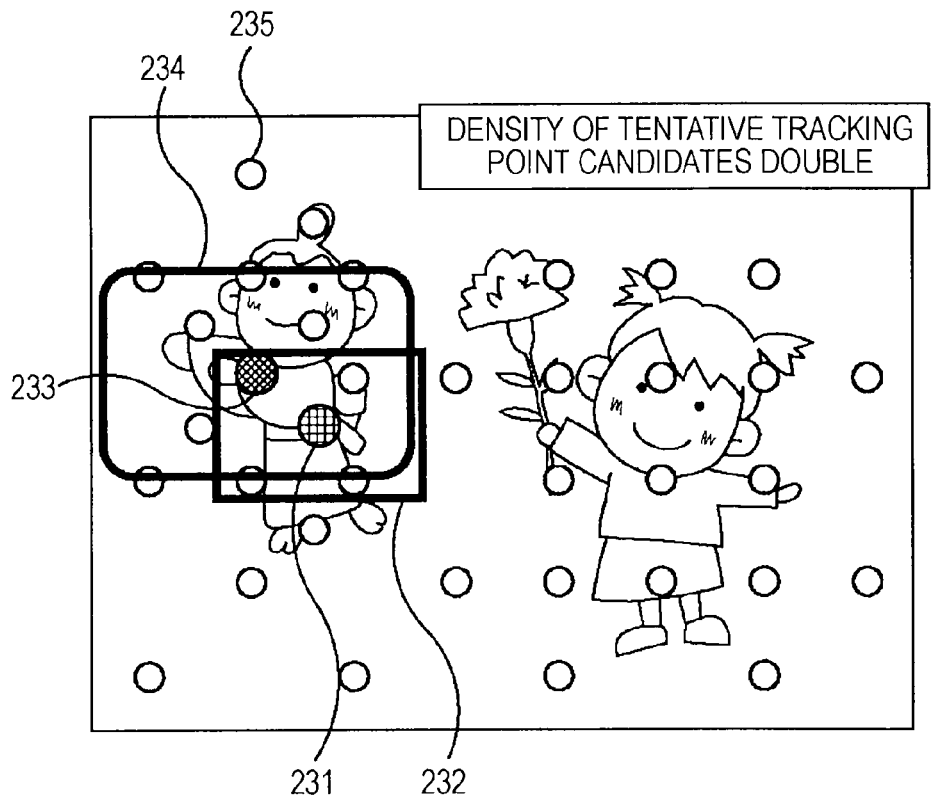

With the tracking point candidate control unit 133, based on the number of times of operation and the zoom frame information, the density within the object region near the current zoom frame 232 of the temporary tracking point candidate 235, with the frame of interest from the playing point-in-time $t_3$ to the playing point-in-time $t_4$, as shown in FIG. 27B, is twice the density of the tracking point candidate determined with the tracking point candidate generating unit 132 within the object region thereof.

Note that with the frame of interest from the playing point-in-time $t_3$ to the playing point-in-time $t_{43}$, no operation is performed, the tracking point candidate becomes the tracking point candidate itself determined by the tracking point candidate generating unit 132.

Also, the user instructs the final tracking point candidate in the vicinity of the object on the left side as to the frame of interest, whereby the tracking point movement information of the tracking point 231 and the setting information expressing the zoom power are registered in the editing history table, along with the feature amount of the frame of interest.

As above, in the case that an operation is performed as to the same playing image in the past, and the past zoom frame which is the zoom frame of the past and the current zoom frame which is the zoom frame before correction of the tracking point are overlapped, i.e. in the case that the user has a strong interest in the object region near the current zoom frame as a region to instruct the tracking point, the tracking point candidates within the object region thereof are increased as compared to the first time of operating. As a result thereof, the desired point can be instructed as a tracking point with fine precision.

Next, the tracking point instruction mode processing with the image processing device 101 in FIG. 13 will be described with reference to the flowchart in FIG. 28. Note that the tracking point instruction mode processing is performed in step S14 in the image processing (FIG. 9) performed with the image processing device 101, similar to the image processing device 53.

In step S111, the image feature amount extracting unit 131 performs block matching or the like using two frames worth of playing image that are continuously input from the playing device 51, and obtains a motion vector for each sampling point. The image feature amount extracting unit 131 supplies the motion vector of each obtained sampling point to the tracking point candidate generating unit 132.

In step S112, the tracking point candidate generating unit 132 computes a frequency distribution of motion vectors, based on the motion vectors of each sampling point supplied from the image feature amount extracting unit 131, using a built-in counter. In step S113, the tracking point candidate generating unit 132 detects the object region by determining the sampling points that exist in the object region, based on the frequency distribution of the motion vectors.

In step S114, the tracking point candidate generating unit 132 initializes the tracking point candidates. The tracking point candidate generating unit 132 then causes every other initialized tracking point candidate to be subject to object determination, and supplies the playing tracking point candidate information for the tracking point candidates that are not subject to object determination to the tracking point candidate control unit 133.

In step S115, the tracking point candidate generating unit 132 causes one undetermined tracking point candidate subject to object determination to be subject to determination of the object determination in the later-described step S116.

In step S116, the tracking point candidate generating unit 132 performs object determination as to whether or not a tracking point candidate subject to determination exists in the object region. In the case the tracking point candidate subject to determination is determined to exist in the object region in step S116, in step S117 the tracking point candidate generating unit 132 outputs the playing tracking point candidate information of the tracking point candidate thereof. The processing is then advanced to step S118.

On the other hand, in the case the tracking point candidate subject to determination is not determined to exist in the object region in step S116, the processing in step S117 is not performed, and the processing is advanced to step S118. In Step S118 the tracking point candidate generating unit 132 determines whether or not there are still any undetermined tracking point candidates subject to object determination. In the case determination is made in step S118 that there are still undetermined tracking point candidates subject to object determination, the flow is returned to step S115, and the processing thereafter is repeated.

Also, in the case determination is made in step S118 that there are no undetermined tracking point candidates subject to object determination, i.e. in the case the object determination in step S116 is performed for all of the tracking point candidates subject to object determination, the processing is advanced to step S119.

In step S119, the image processing device 101 performs tracking point candidate determining processing to determine the tracking point candidate information of the final tracking point candidate, based on the playing tracking point candidate information supplied from the tracking point candidate generating unit 132. The details of the tracking point candidate determining processing are described with reference to the flowchart in the later-described FIG. 29.

After the processing in step S119, the processing is advanced to step S120. The processing in steps S120 through S131 are similar to the processing in steps S62 through S73, so the description is omitted.

However, in the case of superimposing the OSD image of the tracking point in step S122 or S124, when there is no final tracking point candidate at the position expressed by the current tracking point information, the display image generating unit 66 superimposes the OSD image of the tracking point in the position of the final tracking point candidate nearest the position expressed by the current tracking point information. After the processing in step S131, the tracking point instruction mode processing is ended.

Figures 28, 28A:
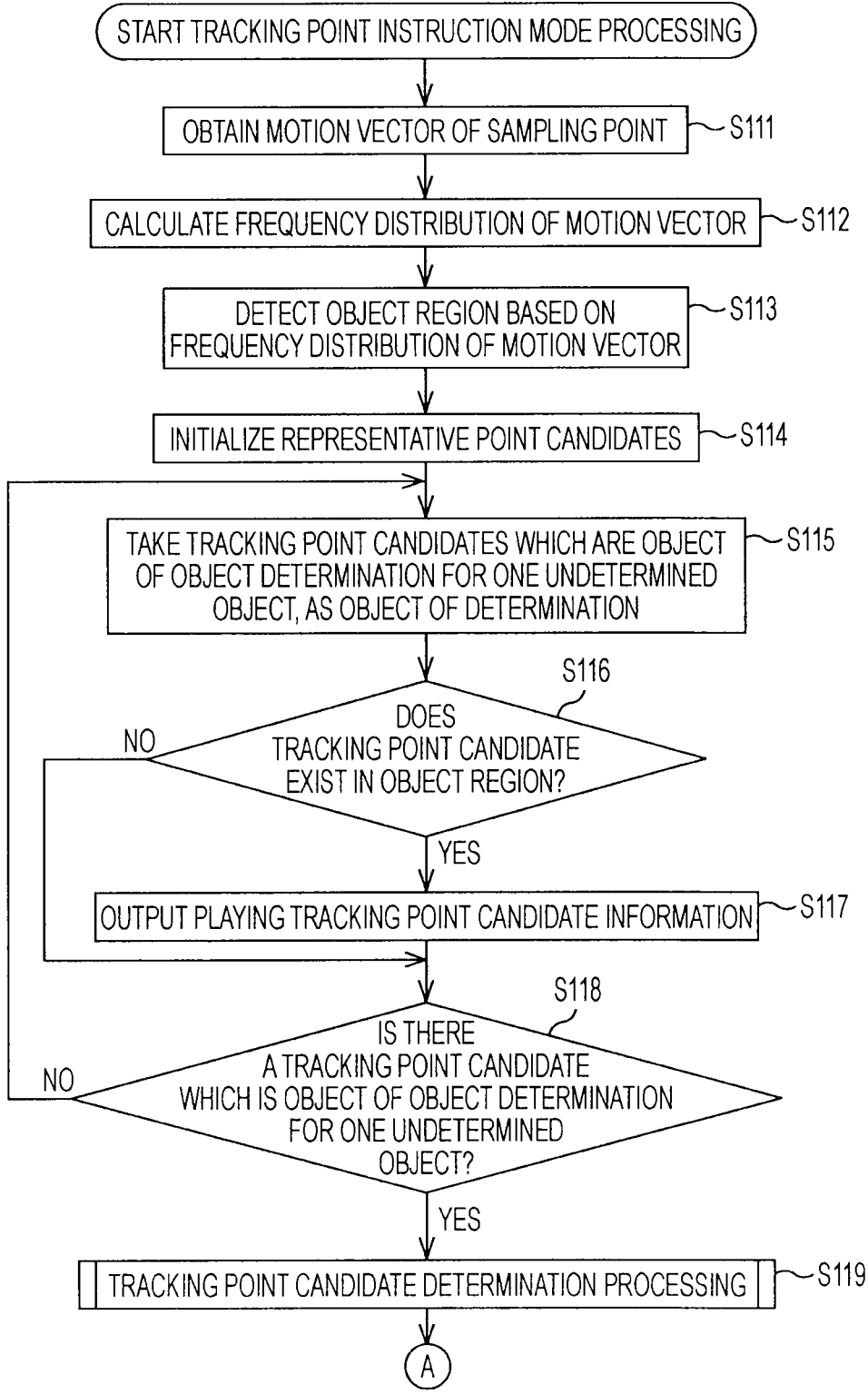
FIG. 28 is a flowchart describing details of other tracking point instruction mode processing.
Figure 28B:
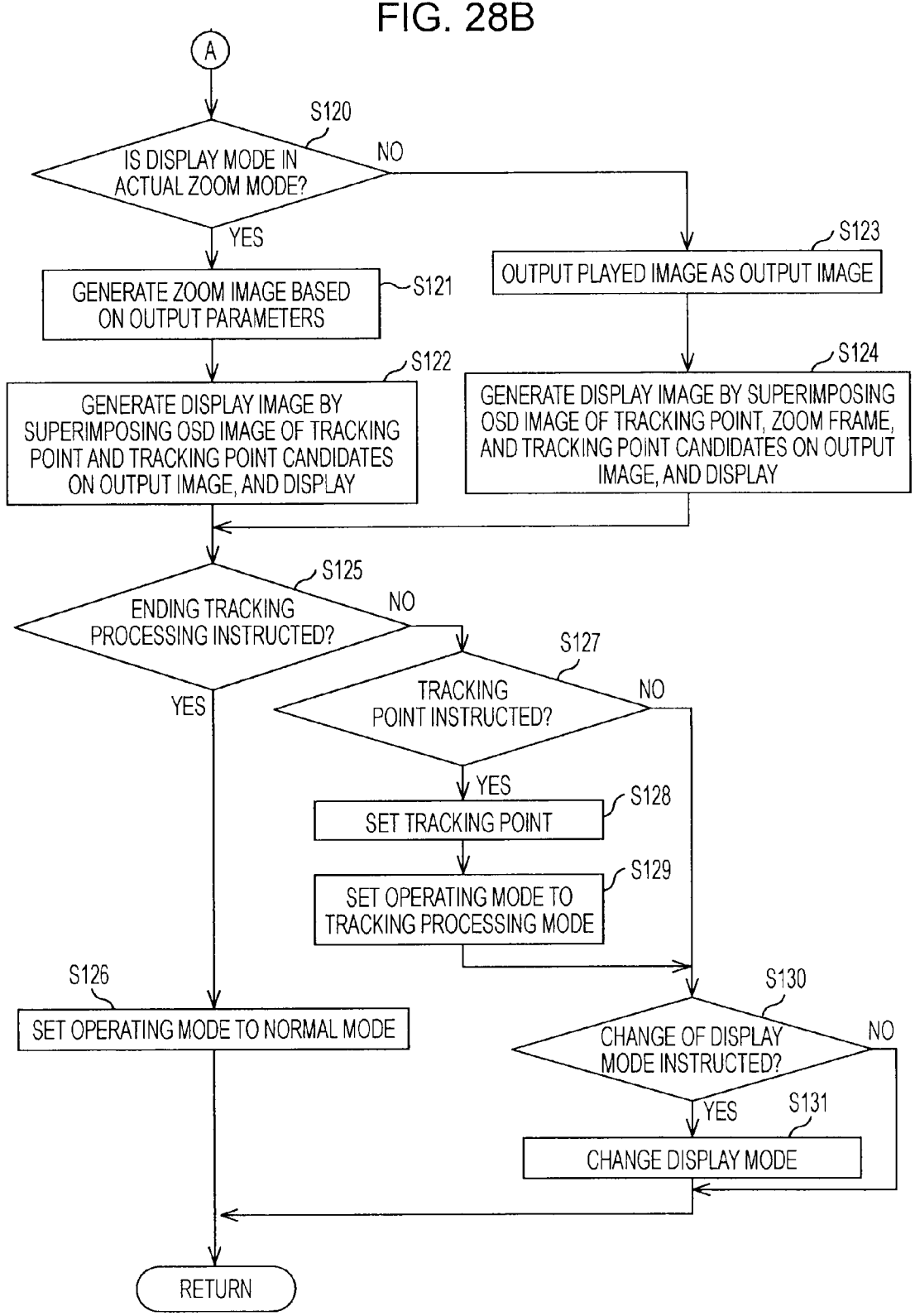

Note that as described in FIG. 9, the image processing is performed each time one frame of the playing image is input, whereby the tracking point instruction mode processing in FIG. 28 is also performed in frame increments. Accordingly, the placement of the tracking point candidates naturally changes in frame increments according to the playing image.

Figure 29:
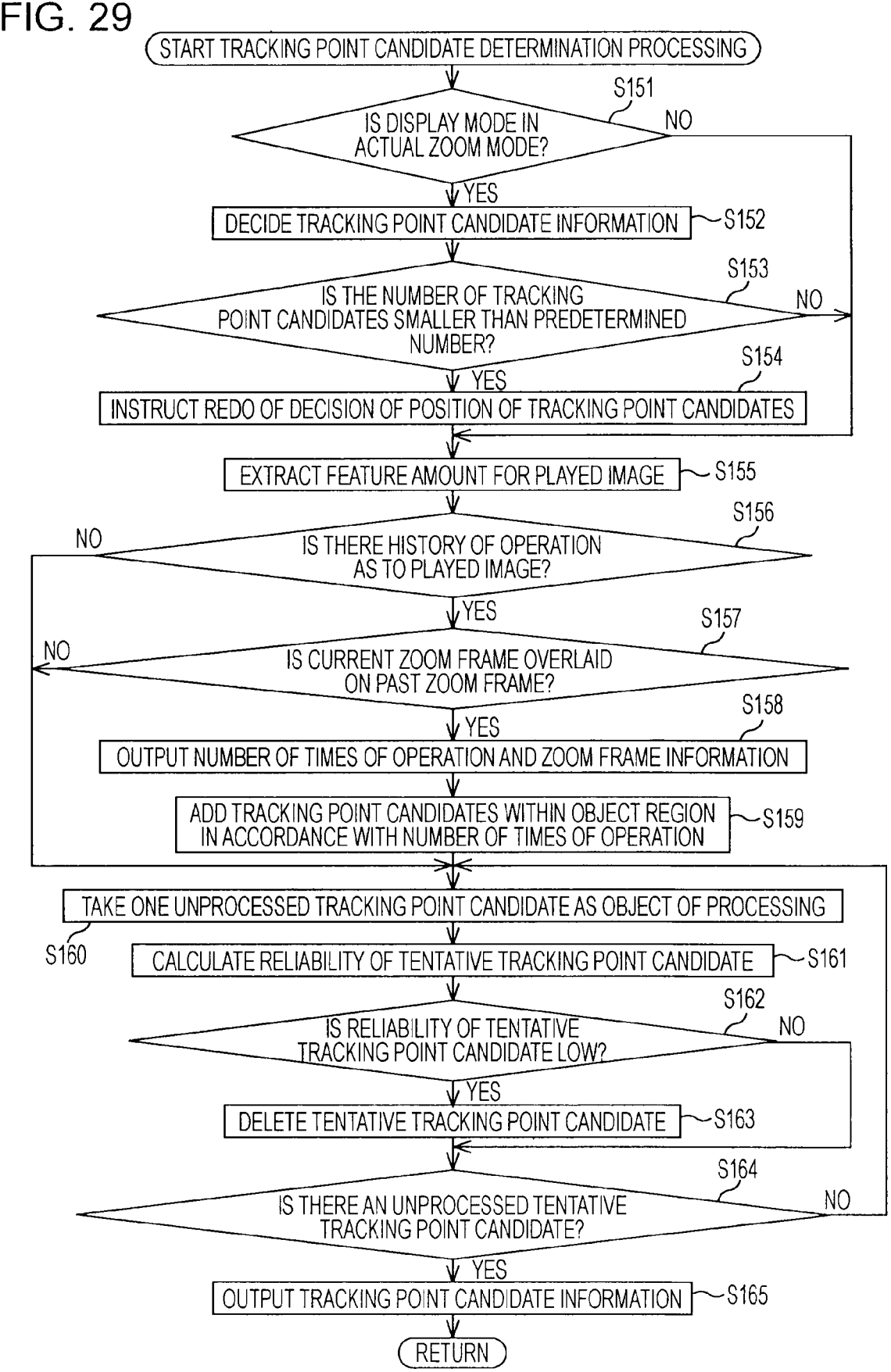
FIG. 29 is a flowchart describing details of the tracking point candidate determining processing.

Next, the tracking point candidate determining processing in step S119 in FIG. 28 will be described with reference to the flowchart in FIG. 29.

In step S151, the tracking point candidate control unit 133 determines whether or not the current mode is the actual zoom mode.

In the case determination is made that the current display mode is the actual zoom mode, in step S152 the tracking point candidate control unit 133 determines the tracking point candidate information, based on the position expressed by the playing tracking point candidate information supplied from the tracking point candidate generating unit 132 and the zoom frame information serving as the output parameter.

In step S153, the tracking point candidate control unit 133 determines whether or not the number of tracking point candidates corresponding to the tracking point candidate information determined in step S152 is less than a predetermined number. In the case determination is made in step S153 that the number of tracking point candidates is smaller than a predetermined number, the tracking point candidate control unit 133 commands a redo of the determining of the position of the tracking point candidate to the tracking point candidate generating unit 132.

Thus, the tracking point candidate generating unit 132 increases the number of tracking point candidates at time of initializing, performs the processing in steps S114 through S118 in FIG. 28 again, and supplies the playing tracking point candidate information to the tracking point candidate control unit 133. As a result thereof, the number of tracking point candidates corresponding to the tracking point candidate information determined based on the playing tracking point candidate information and zoom frame information thereof becomes the same as or greater than a predetermined number.

On the other hand, in the case determination is made in step S153 that the number of tracking point candidate is not less than a predetermined number, the processing in step S154 is not performed, and the processing is advanced to step S155. Also, in the case determination is made in step S151 that the current display mode is not the actual zoom mode, i.e. the current display mode is the frame zoom mode, the processing is advanced to step S155.

In step S155, the image feature amount extracting unit 141 extracts a feature amount for the editing history for each frame, from the playing image input from the playing device 51. The image feature amount extracting unit 141 supplies the feature amount thereof to the editing history recording unit 142 and the editing history determining unit 144.

In step S156, the editing history determining unit 144 determines whether or not there is any history of operations as to the playing image. Specifically, the editing history determining unit 144 searches for the same feature amount as the feature amount of the playing image supplied from the image feature amount extracting unit 141, out of the feature amounts registered in the editing history tale of the editing history recording unit 142. Subsequently, in the case the same feature amount as the feature amount of the playing image supplied from the image feature amount extracting unit 141 is searched, the editing history determining unit 144 determines that there is operating history as to the playing image.

In the case determination is made in step S156 that there is operating history as to the playing image, in step S157 the editing history determining unit 144 determines whether or not the current zoom frame and the past zoom frame overlap.

Specifically, the editing history determining unit 144 determines the zoom frame information of the current zoom frame, based on the setting information supplied immediately prior from the setting information extracting unit 143. Also, the editing history determining unit 144 determines the zoom frame information of the past zoom frame, based on the setting information corresponding to the features amount searched from the editing history table. The editing history determining unit 144 then determines whether or not the current zoom frame and the past zoom frame overlap, based on the zoom frame information of the current zoom frame and past zoom frame thereof.

In the case determination is made in step S157 that the current zoom frame and the past zoom frame overlap, in step S158 the editing history determining unit 144 outputs the number of times that the same feature amount as the feature amount of the playing image services as the number of times of operating to the tracking point candidate control unit 133, and outputs the zoom frame information of the current zoom frame to the tracking point candidate control unit 133.

In step S159, the tracking point candidate control unit 133 adds a tracking point candidate of the abject region near the current zoom frame according to the number of times of operating that is supplied from the editing history determining unit 144, and causes the tracking point candidate after adding as the temporary tracking point candidate. For example, in the case that the number of times of operating is once as in the case of FIGS. 24 and 27, the tracking point candidate control unit 133 causes the density of the temporary tracking point candidates within the object region to be twice, and in the case that the number of times of operating is twice as in the case in FIGS. 25A and 25B, the density of the temporary tracking point candidates within the object region is triple. The tracking point candidate control unit 133 then supplies the playing tracking point candidate information of the temporary tracking point candidate to the tracking control unit 122, and the processing is advanced to step S160.

On the other hand, in the case determination is made in step S156 that there is not operating history as to the playing image, and in the case determination is made in step S157 that the current zoom frame does not overlap the past zoom frame, the tracking point candidate control unit 133 supplies the tracking point candidate corresponding to the playing tracking point candidate information supplied from the tracking point candidate generating unit 132 as a temporary tracking point candidate, to the tracking control unit 122. The processing is then advanced to step S160.

In step S160, the tracking control unit 122 subjects to processing, of the later-described processing in step S162, one of the unprocessed temporary tracking point candidates out of the temporary tracking point candidates corresponding to the playing tracking point candidate information supplied from the tracking point candidate control unit 133. The tracking control unit 122 supplies the playing tracking point candidate information of the temporary tracking point candidate subject to processing to the tracking point extracting unit 121.

In step S161, the tracking point extracting unit 121 computes the reliability of the motion vector of the temporary tracking point candidates subject to processing, based on the playing image input from the playing device 51, and the playing tracking point candidate information of the temporary tracking point candidate subject to processing that is supplied from the tracking control unit 122. The reliability of the motion vector is supplied to the tracking point candidate control unit 133 via the tracking control unit 12.

In step S162, the tracking point candidate control unit 133 determines whether or not the reliability of the motion vector supplied from the tracking control unit 122 is low. In the case determination is made in step S162 that the reliability of the motion vector is low, the temporary tracking point candidate subject to processing is deleted in step S163. That is to say, the temporary tracking point candidate subject to processing does not become the final tracking point candidate.

On the other hand, in the case determination is made in step S162 that the reliability of the motion vector is high, the processing in step S163 is not performed. That is to say, the temporary tracking point candidate subject to processing becomes the final tracking point candidate.

As above, based on the reliability of the motion vector of the temporary tracking point candidate, the final tracking point candidate is determined, so the user can easily instruct the point to be successfully tracked as the tracking point.

Specifically, there are cases wherein the tracking point is not successfully tracked, with the detection precision of the motion vectors in the tracking processing. For example, in the case that a block matching method is used as a detecting method for a motion vector in the tracking processing, when the brightness difference of the blocks is small, the motion vector in error with a matching error is detected, and as a result thereof there is a case wherein the tracking point is not successfully tracked. Accordingly, in the case a tracking point candidate exists in a region wherein such a detecting error occurs, even if the user instructs the tracking point candidate thereof as the tracking point, the probability that the tracking point will be successfully tracked is extremely small.

Conversely, with the tracking system 100, the temporary tracking candidate points existing in the region wherein a tracking error occurs is deleted from the final tracking point candidate, based on the reliability of the motion vector of the temporary tracking point candidate, whereby the user can instruct the point to be successfully tracked as a tracking point, by instructing the final tracking point candidate as the tracking point.

After the processing in step S163, or in the case determination is made in step S162 that the reliability of the motion vector his high, in step S164 the tracking control unit 122 determines whether or not there are still any unprocessed temporary tracking point candidates. In the case determination is made that there are still unprocessed temporary tracking point candidates, the processing is returned to step S160, and the processing thereafter is repeated.

Also, in the case the processing in step S162 is performed wherein there are no unprocessed temporary tracking point candidates in step S164, i.e. all of the temporary tracking point candidates, the processing is advanced to step S165.

In step S165, the tracking point candidate control unit 133 supplies the tracking point candidate information of the temporary tracking point candidate to the display image generating unit 66 as tracking point candidate information of the final tracking point candidate, based on the playing tracking point candidate information of the temporary tracking point candidate no deleted in step S163 and the current display mode and zoom frame information. The processing is then returned to step S119 in FIG. 28, and the processing in step S120 and thereafter is performed.

Note that with the above-described description, the temporary tracking point candidate with low reliability is just deleted, but in a case other than a case wherein the number of temporary tracking point candidates to become the final tracking point candidate is large, or in a case that a temporary tracking point candidate existing in the periphery of the temporary tracking point candidate thereof is selected as the final tracking point candidate, instead of the temporary tracking point candidate with low reliability being deleted, the point within the object region wherein the temporary tracking point candidate exists may be added as a final tracking point candidate.

The above-described flow of processing can be executed with hardware or can be executed with software. In the case the flow of processing is executed with software, the program making up the software thereof is installed from a program recording medium in a computer built into dedicated hardware or a general use personal computer for example which can execute various types of functions by installing various types of programs.

Figure 30:
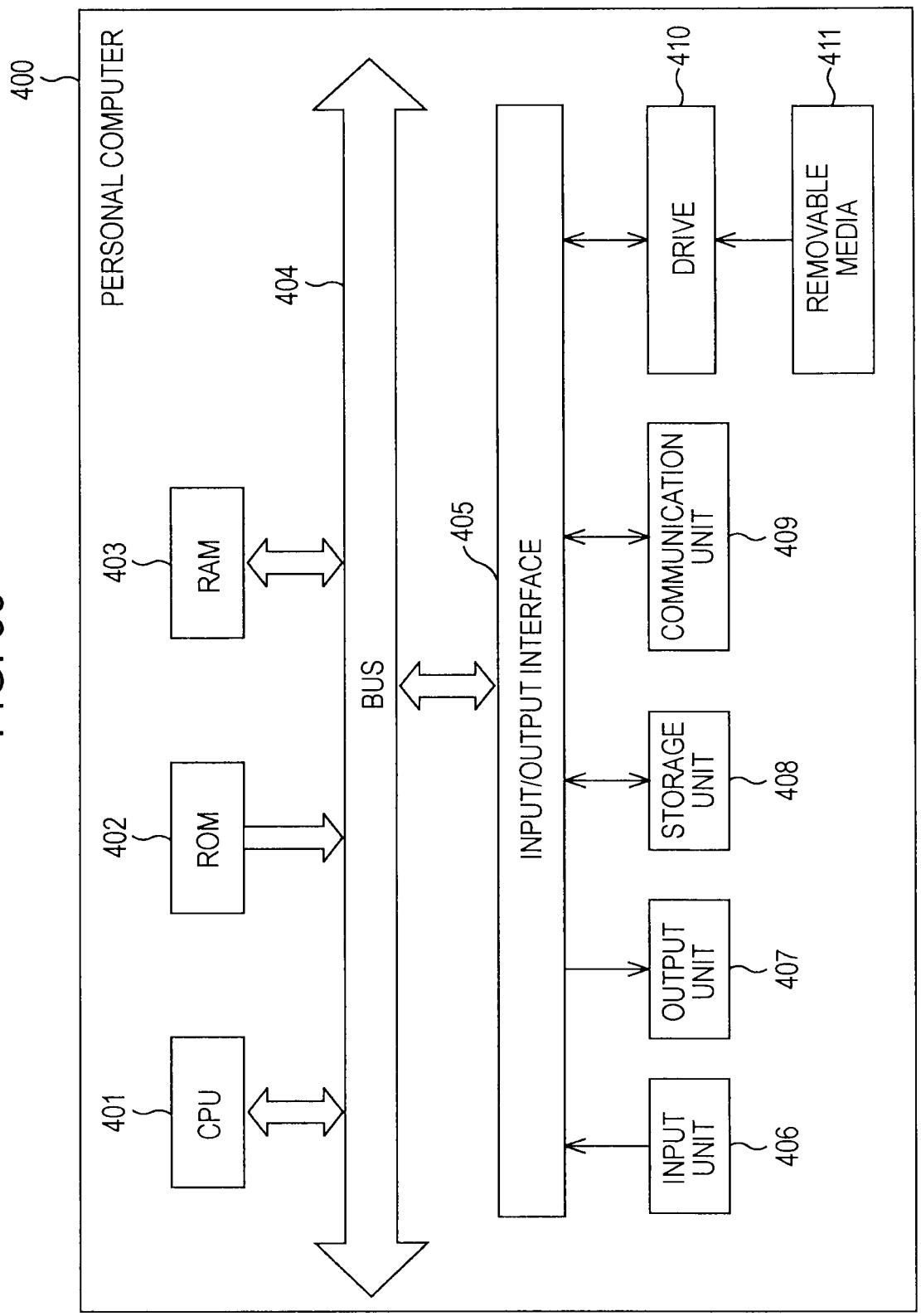
FIG. 30 is a block diagram illustrating the configuration example of a personal computer.

FIG. 30 is a block diagram illustrating a configuration example of the hardware of a personal computer 400 to execute the above-described flow of processing with a program. With the personal computer 400, a CPU (Central Processing Unit) 401, ROM (Read Only Memory) 402, and RAM (Random Access Memory) 403 are mutually connected by a bus 404.

The bus 404 is further connected to an input/output interface 405. The input/output interface 405 is connected to an input unit 406 made up of a receiving unit and the like to receive commands sent form a keyboard, mouse, microphone, and remote controller, an output unit 407 made up of a display, speaker, and the like, a storage unit 408 made up of a hard disk, non-volatile memory, or the like, a communication unit 409 made up of a network interface or the like, and a drive 410 to drive a removable media 411 such as a magnetic disk, optical disc, magneto-optical disk, or semiconductor memory.

With the personal computer 400 thus configured, the CPU 401 loads the program stored in the storage unit 408 to the RAM 403, for example, via the input/output interface 405 and bus 404 and executes, whereby the above-described flow of processing is performed.

The program that the CPU 401 of the personal computer 400 executes may be recorded on a removable media 411 which is a packaged media made up of a magnetic disk (including a flexible disk), optical disc (CD-ROM (Compact Disc-Read Only Memory), DVD (Digital Versatile Disc), etc), magneto-optical disk, or semiconductor memory, or is provided via a cable or wireless transmission medium such as a local area network, the internet, or a digital satellite broadcast.

By mounting the removable media 411 on the drive 410, the program may be installed in the storage unit 408 via the input/output interface 405. Also, the program is received with the communication unit 409 via the cable or wireless transmission medium, and may be installed in the storage unit 408. Other than this, the program can be installed beforehand in the ROM 402 or storage unit 408.

Note that with the present Specification, the steps describing the program stored in the program recording medium of course include processing performed along the described order in a time-series manner, but is not restricted to this, and processing executed in parallel or individually is also included.

Also, with the present Specification, the term "system" refers to overall equipment made up of multiple devices.

Further, the embodiments of the present invention are not limited to the above-described embodiments, and various types of modifications can be made within the scope and intent of the present invention.

The present application contains subject matter related to that disclosed in Japanese Priority Patent Application JP 2008-142981 filed in the Japan Patent Office on May 30, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device, comprising:
    tracking means for tracking a predetermined point on an image as a tracking point, to correspond with a first operation;
    display control means for displaying tracking point candidates, which are greater in number than objects on said image and fewer than the number of pixels of said image, on said image, at an equidistant spacing; and
    setting means for setting one of said tracking point candidates as a tracking point on a next frame of said tracking means, in response to an instruction of the one of said tracking point candidates during a display of said tracking point candidates at the equidistant spacing.

2. An image processing device, comprising:
    a tracking unit to track a predetermined point on an image as a tracking point, to correspond with a first operation;
    a display control unit to display tracking point candidates, which are greater in number than objects on said image and fewer than the number of pixels of said image, on said image, at an equidistant spacing; and
    a setting unit to set one of said tracking point candidates as a tracking point on a next frame of said tracking unit, in response to an instruction of the one of said tracking point candidates during a display of said tracking point candidates at the equidistant spacing.

3. The image processing device according to claim 2, wherein said display control unit displays tracking point candidates not uniformly distributed on said image.

4. The image processing device according to claim 3, further comprising:
    a detecting unit to detect a region of an object on said image, wherein said display control unit displays said tracking point candidates within said object region, densely as compared to said tracking point candidates within a region other than said object region, based on the detecting result of said detecting unit.

5. The image processing device according to claim 4, wherein said display control unit displays, of determination points which are points at every predetermined spacing of points provided at equidistant spacing on said image, said determination points within said object region and points other than said determination points as tracking point candidates, based on detection results by said detecting unit.

6. The image processing device according to claim 3, wherein, when current tracking points in said image are within a predetermined range from past tracking points, said display control unit densely displays tracking point candidates within a predetermined range from said current tracking points, based on a history of operations.

7. The image processing device according to claim 3, wherein said display control unit displays said tracking point candidates, based on reliability as to the tracking of said tracking point candidates.

8. The image processing device according to claim 2, wherein said display control unit increases a number of said tracking point candidates from said tracking point candidates displayed on the image near said tracking points so that the number of said tracking point candidates to be displayed are at or above a predetermined number, in the case of displaying said tracking point candidates on a zoom image of the image near said tracking points in said image, corresponding to the operations.

9. An image processing method for an image processing device that performs a tracking processing to track tracking points on an image, said method comprising:

tracking a predetermined point on said image as a tracking point, to correspond with a first operation;

displaying tracking point candidates, which are greater in number than objects on said image and fewer than the number of pixels of said image, on said image, at an equidistant spacing; and setting one of said tracking point candidates as one of said tracking points on a next frame, in response to an instruction of the one of said tracking point candidates during a display of said tracking point candidates at the equidistant spacing.

10. A non-transitory computer-readable storage medium storing a program to cause a computer to perform a method of an image processing device, the method comprising:

tracking a predetermined point on an image as a tracking point, to correspond with a first operation;

displaying tracking point candidates, which are greater in number than objects on said image and fewer than the number of pixels of said image, on said image, at an equidistant spacing; and setting one of said tracking point candidates as a tracking point on a next frame, in response to an instruction of the one of said tracking point candidates during a display of said tracking point candidates at the equidistant spacing.

* * * * *